(12) United States Patent
Ko

(10) Patent No.: US 10,877,569 B2
(45) Date of Patent: Dec. 29, 2020

(54) TOUCH DEVICE AND OPERATING METHOD THEREOF

(71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/423,030

(22) Filed: May 26, 2019

(65) Prior Publication Data

US 2020/0150778 A1    May 14, 2020

(30) Foreign Application Priority Data

Nov. 14, 2018   (TW) .............................. 107215442 U

(51) Int. Cl.
*G06F 3/02*     (2006.01)
*G06F 3/041*    (2006.01)
*G06F 3/039*    (2013.01)
*G06F 3/0354*   (2013.01)

(52) U.S. Cl.
CPC .......... *G06F 3/0202* (2013.01); *G06F 3/0219* (2013.01); *G06F 3/0227* (2013.01); *G06F 3/0393* (2019.05); *G06F 3/03547* (2013.01); *G06F 3/04162* (2019.05)

(58) Field of Classification Search
CPC .. G06F 3/0202; G06F 3/04162; G06F 3/0219; G06F 3/0227; G06F 3/03547; G06F 3/0393
See application file for complete search history.

(56) References Cited

U.S. PATENT DOCUMENTS

| | | | |
|---|---|---|---|
| 6,243,258 B1* | 6/2001 | Paratore | G06F 1/1618 345/168 |
| 2010/0238119 A1* | 9/2010 | Dubrovsky | G06F 3/04886 345/169 |
| 2016/0149597 A1* | 5/2016 | Takasu | G06F 1/1632 455/127.2 |
| 2017/0068282 A1* | 3/2017 | Smith | G06F 1/1628 |

\* cited by examiner

*Primary Examiner* — Abhishek Sarma
(74) *Attorney, Agent, or Firm* — JCIPRNET

(57) ABSTRACT

The disclosure provides a touch device and an operating method thereof. The touch device includes a touch panel, a positioning structure, and a detecting module. The touch panel bears a detachable keyboard module. The positioning structure fixes the detachable keyboard module on the touch panel, wherein the detachable keyboard module fixed on the touch panel partially covers the touch panel. The detecting module detects the detachable keyboard module fixed on the touch panel.

18 Claims, 21 Drawing Sheets

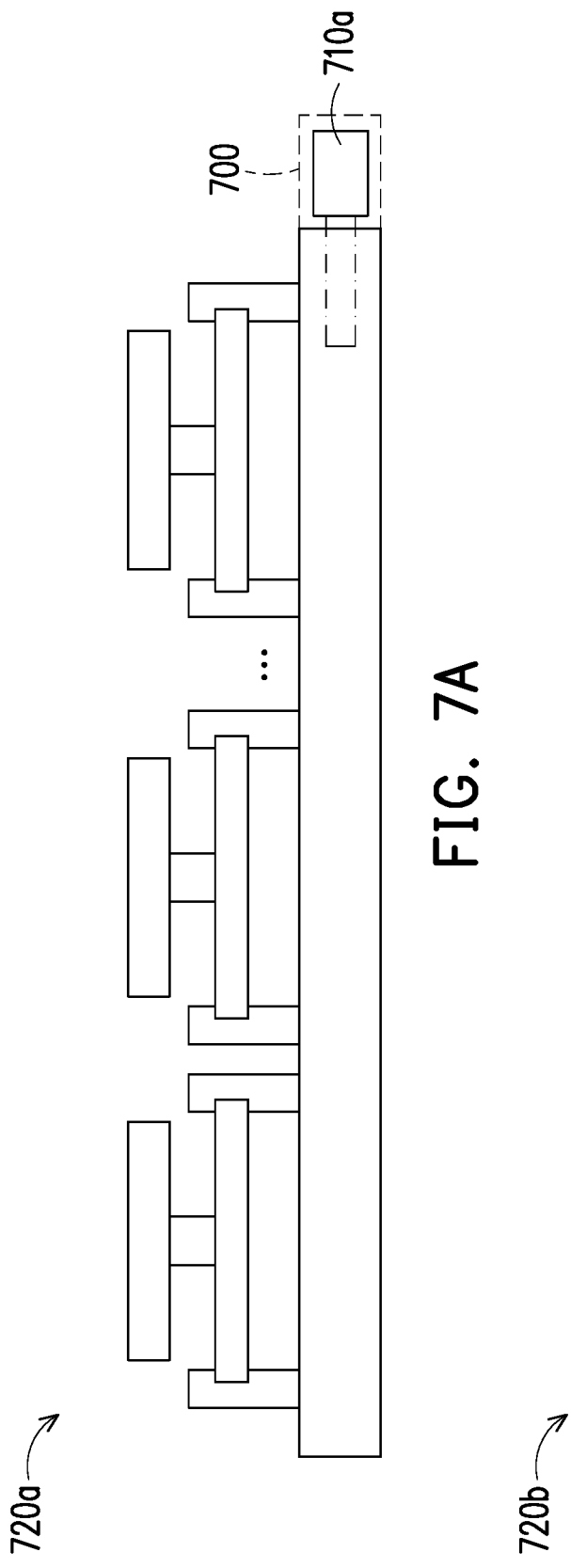
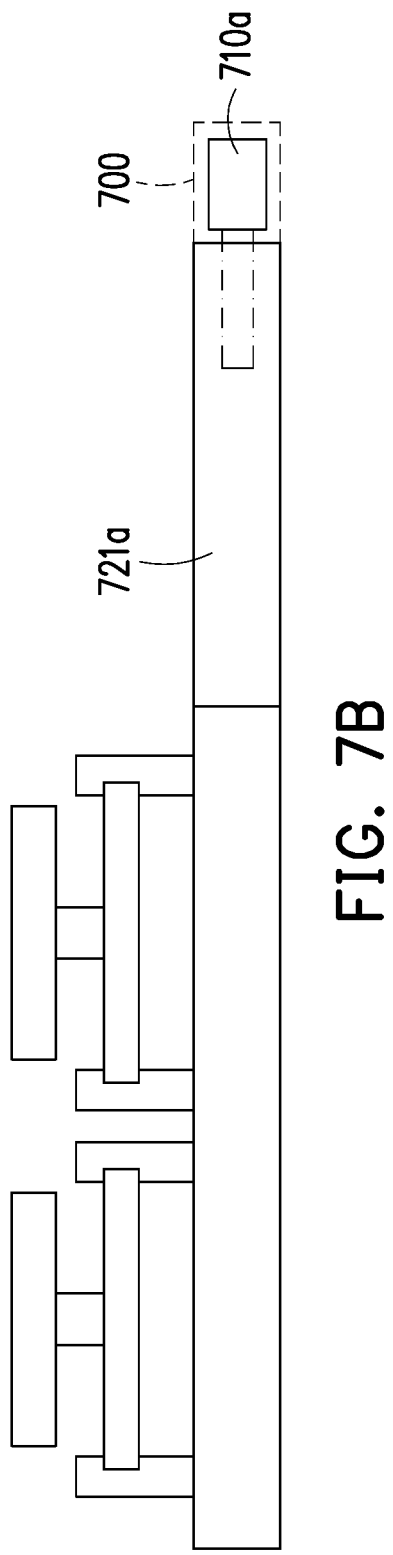
FIG. 7A
FIG. 7B

TOUCH DEVICE AND OPERATING METHOD THEREOF

CROSS-REFERENCE TO RELATED APPLICATION

This application claims the priority benefit of Taiwan application serial no. 107215442, filed on Nov. 14, 2018. The entirety of the above-mentioned patent application is hereby incorporated by reference herein and made a part of this specification.

BACKGROUND

Technical Field

The present disclosure relates to a touch device and an operating method thereof, and more particularly to a touch device that can provide a key function when bearing a detachable keyboard module and an operating method thereof.

Description of Related Art

With the development of technology, people have been able to operate personal computers through increasingly various input devices. For example, in addition to the general mouse and keyboard, manufacturers have developed e-sports mouse, keys and shortcuts for facilitating drawing, and even knobs dedicated to adjusting the sound.

As for notebook (NB) computers, most of their existing input devices are keyboards, trackpads, and small red dots. With the maturity of touch-related technologies in recent years, there has been a design idea about enlarging the NB's touchpad, or even changing the keyboard area of the NB to a touch screen.

Please refer to FIG. 1, which is a schematic diagram of an NB having different sizes of touch panels. As can be seen from FIG. 1, after the NB touch panel (which is illustrated as a shadow area in FIG. 1) is enlarged, although the user can operate the NB more conveniently and intuitively under certain operating conditions, the space available for disposing the keyboard on the NB would become smaller. Therefore, it is an important issue for a person skilled in the art to design a mechanism for the user to maintain the input experience of operating the keyboard in the case of using a large touchpad.

SUMMARY

In view of this, the present disclosure provides a touch device and an operating method thereof that can be used to solve the above technical problems.

The present disclosure provides a touch device including a touch panel, a positioning structure, and a detecting module. The touch panel bears a detachable keyboard module. The positioning structure fixes the detachable keyboard module to the touch panel, wherein the detachable keyboard module fixed to the touch panel partially covers the touch panel. The detecting module detects the detachable keyboard module fixed on the touch panel.

The present disclosure provides an operating method of a touch device comprising a touch panel, a positioning structure and a detecting module. The method includes: bearing, by the touch panel, a detachable keyboard module; fixing, by the positioning structure, the detachable keyboard module to the touch panel, wherein the detachable keyboard module fixed to the touch panel partially covers the touch panel; and detecting, by the detecting module, the detachable keyboard module fixed on the touch panel.

Based on the above, the touch device and the operating method thereof proposed by the disclosure can be used with a variety of detachable keyboard modules. In this case, the user can place a detachable keyboard module having a corresponding keyboard aspect on the touch panel according to requirements, so as to operate the touch device in a manner consistent with general keyboard input habits.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 7A is a schematic diagram of detecting a detachable keyboard module by a detecting module according to an embodiment of the present disclosure.

FIG. 7B is a schematic diagram of detecting a detachable keyboard module by using a detecting module according to FIG. 7A.

DESCRIPTION OF THE EMBODIMENTS

Roughly speaking, the touch device provided by the present disclosure can fix one or more different types of detachable keyboard modules to a preset position on the touch panel through a specially designed positioning structure. Then, the touch device of the present disclosure can detect the detachable keyboard module through the detecting module, and after determining that the detachable keyboard module is detected, the touch signals obtained in the coverage of the detachable keyboard module are converted into key events correspondingly. In this way, the user can operate the detachable keyboard module to achieve the previous experience of operating the keyboard. Moreover, when the user only needs to use the touch function of the touch device, the detachable keyboard module can be directly removed from the touch device, thereby obtaining a more flexible operation experience. Detailed discussions will be provided below.

Figure 1:
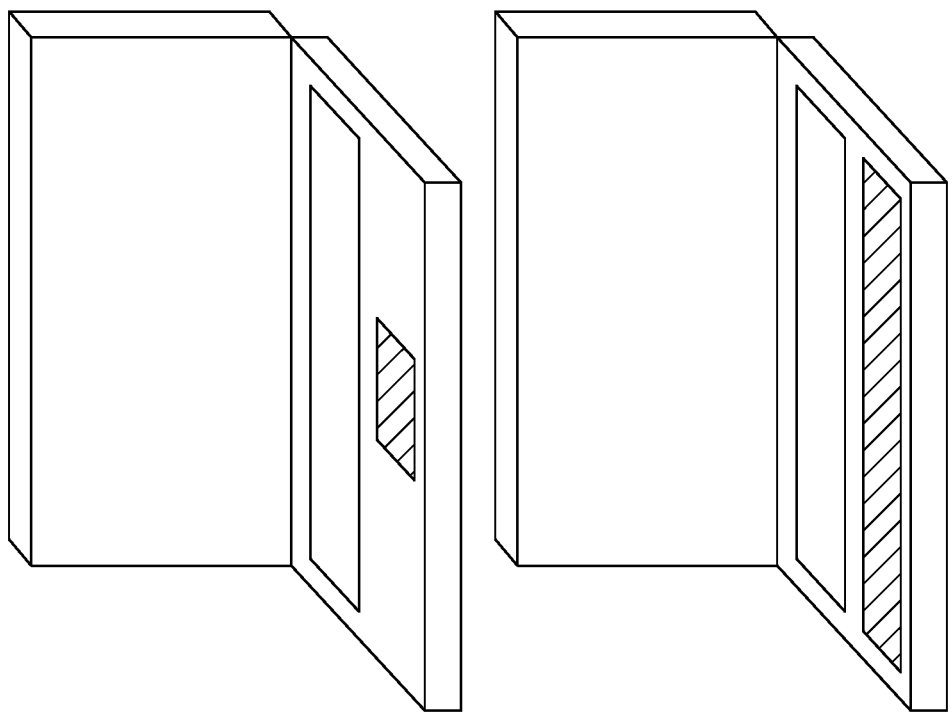
FIG. 1 is a schematic diagram of an NB having different size of touch panels.
Figure 1:
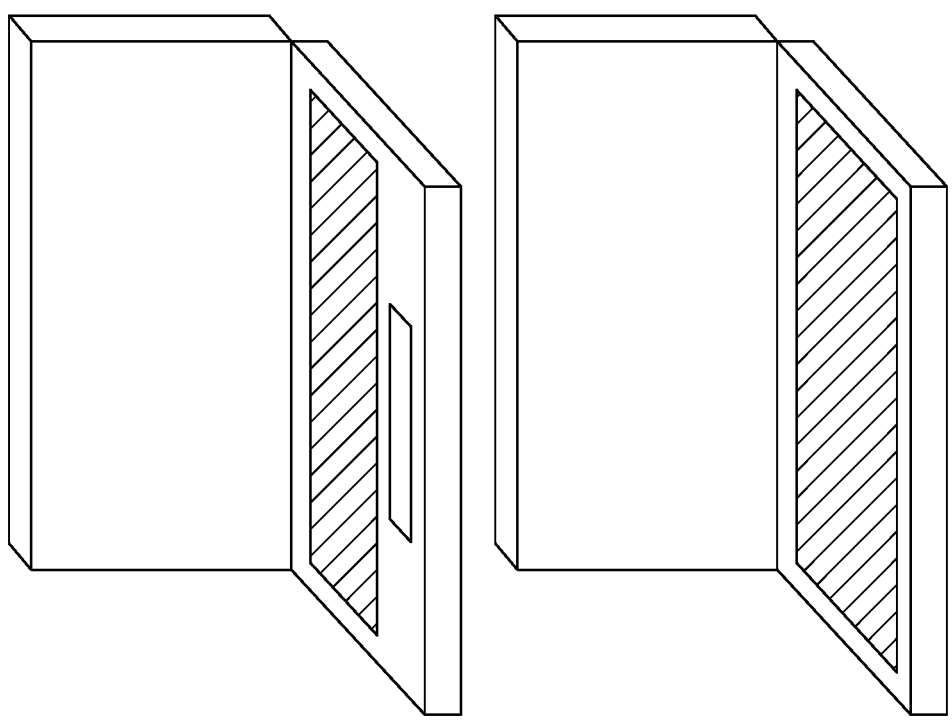
Figure 2:
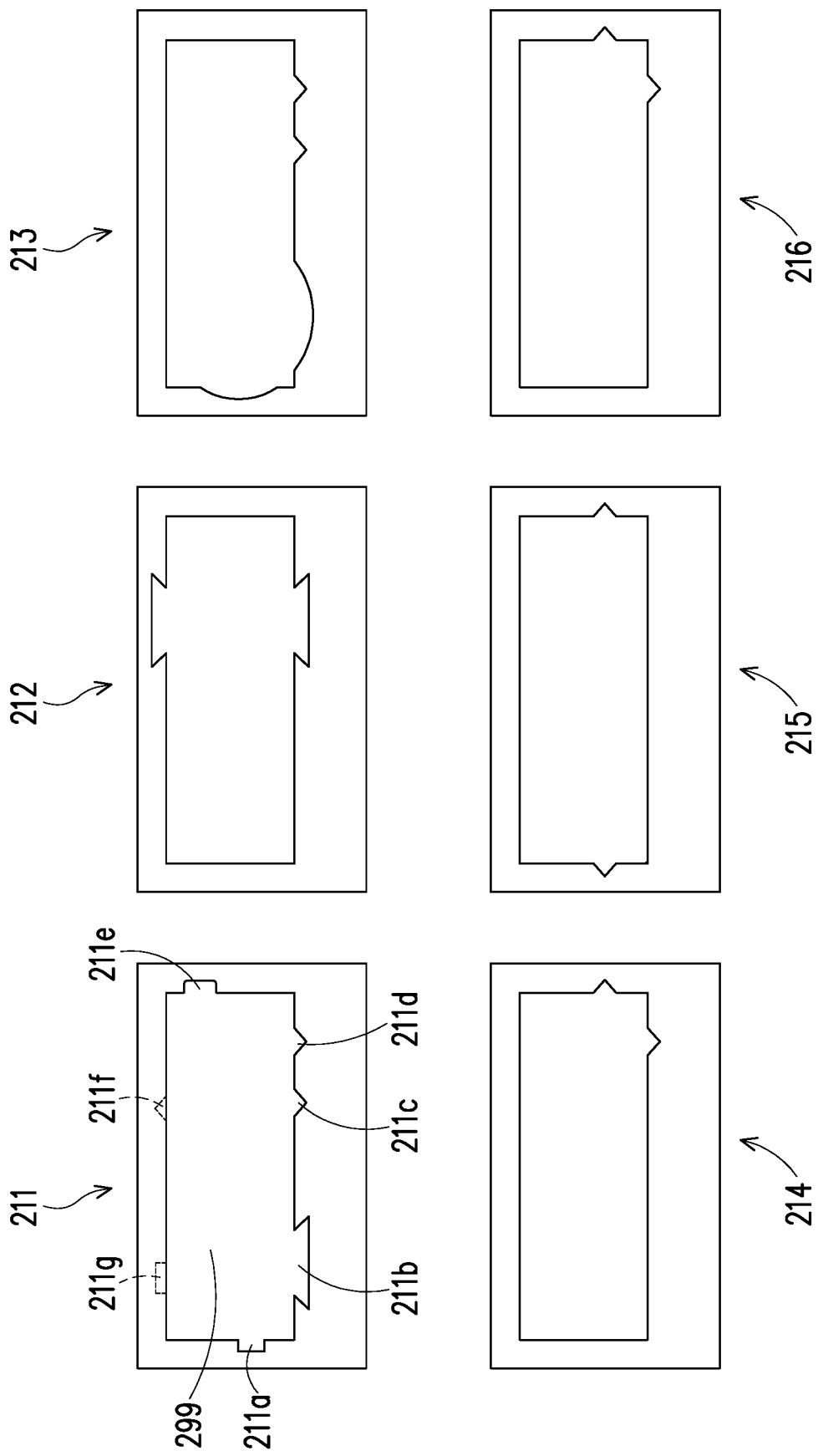
FIG. 2 is a top view of a touch device according to various embodiments of the present disclosure.

Please refer to FIG. 2, which is a top view of a touch device according to various embodiments of the present disclosure. In FIG. 2, each of the touch devices 211, 212, 213, 214, 215, and 216 can be implemented as a touch panel or a touch screen of an NB, a tablet, or the like for the user to perform touch input operations, but the disclosure is not limited thereto. Moreover, each of the touch devices 211 to 216 in FIG. 2 may be provided with a positioning structure for fixing the detachable keyboard module to a preset position of the touch panel.

Taking the touch device 211 as an example, the touch panel 299 and the positioning structures 211a, 211b, 211c, 211d, 211e, 211f, and 211g may be included. In this embodiment, the positioning structures 211a-211g can be implemented as positioning slots and disposed on the side of the touch panel 299, which can be used to fix the detachable keyboard module to the touch panel 299.

It should be understood that although the touch device 211 of FIG. 2 is illustrated as having a plurality of positioning structures 211a-211g, it is merely used as an example and is not intended to limit the possible embodiments of the present disclosure. In other embodiments, the designer may also modify the touch device 211 to have only one or more of the positioning structures 211a-211g, and the positions of the positioning structures 211a-211g may also be adjusted according to the designer's needs. Moreover, the positioning structures 211a-211g can also be used to simultaneously fix a plurality of detachable keyboard modules on the touch panel 299.

In addition, in order to fix the detachable keyboard module by the positioning structures 211a-211g, the detachable keyboard module may be provided with one or more protruding portions corresponding to the positioning structures 211a-211g. Therefore, when the protruding portion of the detachable keyboard module is placed in one or more of the positioning structures 211a-211g, the positioning structure 211a-211g accommodating the protruding portions may fix the detachable keyboard module to a preset position on the touch panel 299.

For example, if the detachable keyboard module is to be fixed by the positioning structure 211a, the left side of the detachable keyboard module may be provided with a protruding portion, and the shape of the protruding portion (for example, a rectangle) and the size may be identical to the shape and size of the positioning structure 211a. In this case, when the user places the protruding portion of the detachable keyboard module into the positioning structure 211a, the detachable keyboard module can be fixed to the left side of the touch panel 299. In another example, if the detachable keyboard module is to be fixed by the positioning structure 211b, the bottom side of the detachable keyboard module may be provided with a protruding portion, and the shape of the protruding portion (for example, trapezoid) and the size may be identical to the shape and size of the positioning structure 211b. In this case, when the user places the protruding portion of the detachable keyboard module into the positioning structure 211b, the detachable keyboard module can be fixed to the bottom side of the touch panel 299.

In addition, if the detachable keyboard module is to be fixed by the positioning structures 211a and 211b at the same time, the left and bottom sides of the detachable keyboard module may be respectively provided with the above two types of protruding portions. Therefore, when the two protruding portions of the detachable keyboard module are individually placed in the positioning structures 211a and 211b, the positioning structures 211a and 211b can collaboratively fix the detachable keyboard module on the touch panel 299.

In addition, in FIG. 2, the positioning structures 211f and 211g, which are shown as dashed lines, can be implemented as a hidden positioning slot, which can be understood as a slot that cannot be viewed from the top view of FIG. 2. Therefore, if the detachable keyboard module is to be fixed by the positioning structure 211f and/or 211g, the detachable keyboard module may be provided with a protruding portion that can be inserted into the positioning structure 211f and/or 211g. In this case, when the user inserts the protruding portion of the detachable keyboard module into the positioning structure 211f and/or 211g, the detachable keyboard module can be fixed to the top side of the touch panel 299.

Based on the above teachings, those skilled in the art should be able to correspondingly learn the practice of fixing the detachable keyboard module by one or more of the positioning structures 211c to 211e. Moreover, those skilled in the art should also know that the detachable keyboard module can be fixed to the touch panel of the touch devices 212-216 by the positioning structure (not labelled) in each of the touch devices 212-216. The details of the method will not be described herein.

In other embodiments, the present disclosure also proposes a positioning structure for fixing the detachable keyboard module to the touch panel by magnetic force, and the related details will be described later.

Figure 3:
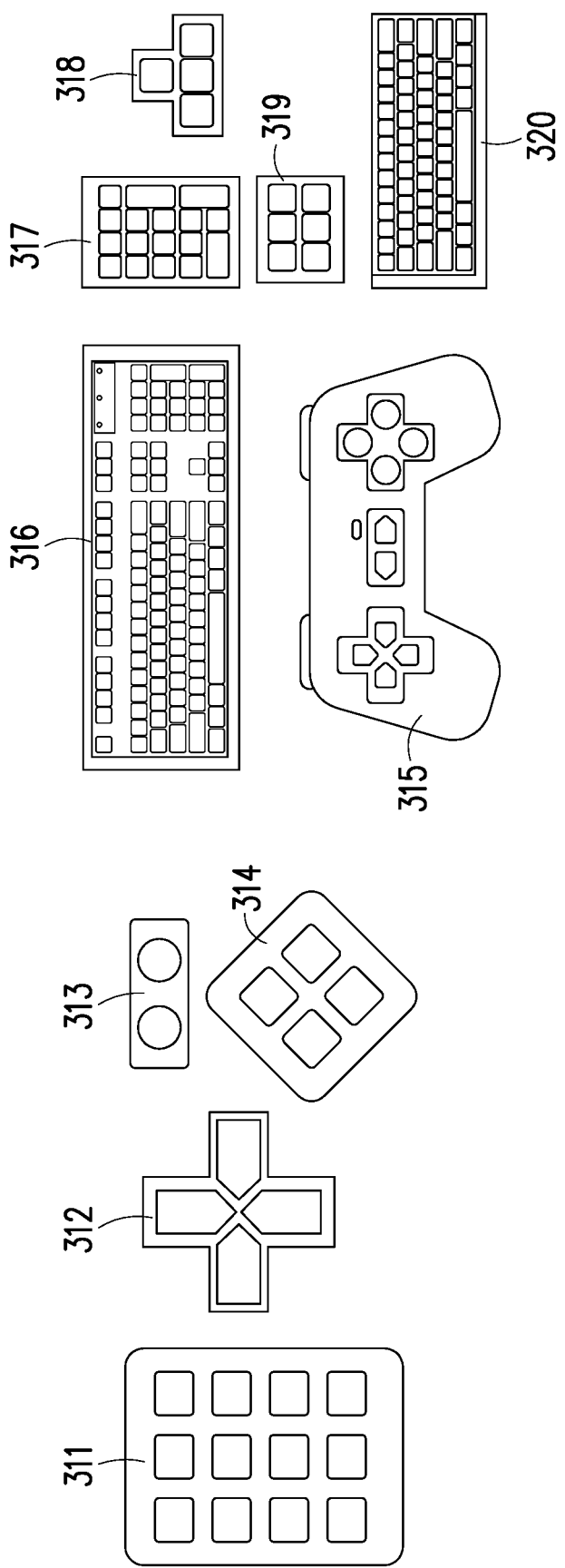
FIG. 3 shows a plurality of possible embodiments of a detachable keyboard module according to an embodiment of the present disclosure.

Please refer to FIG. 3, which shows a plurality of possible implementation manners of the detachable keyboard modules according to the creative embodiment of the present disclosure. As shown in FIG. 3, the detachable keyboard module of the present disclosure can be implemented as keyboard aspects 311, 312, 313, 314, 315 having special structures. Alternatively, the detachable keyboard module of the present disclosure can also be implemented as a keyboard aspect 316 having a complete key configuration, or keyboard aspects 317, 318, 319, 320 including only a part of the keys, but the disclosure is not limited thereto. In addition, the detachable keyboard modules in the disclosure can be passive keyboard modules. That is, the detachable keyboard module of the present disclosure can be used without a power source.

Figure 4A:
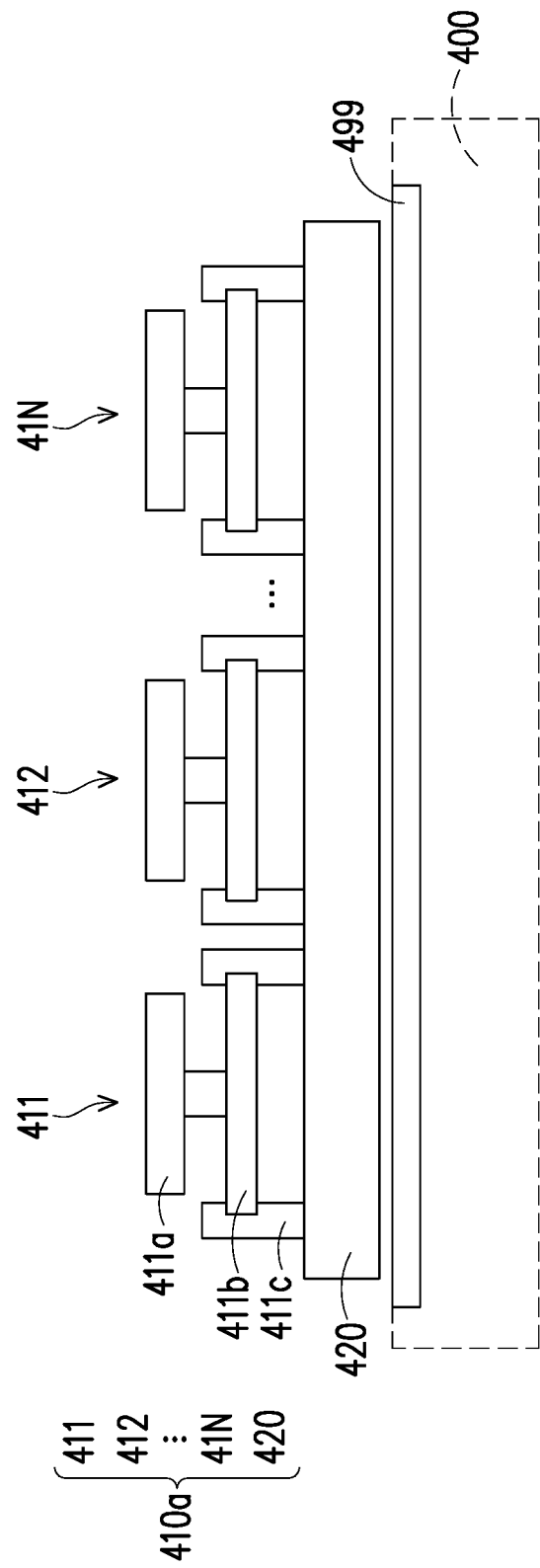
FIG. 4A is a side view of a detachable keyboard module provided with a carrier according to an embodiment of the present disclosure.

Please refer to FIG. 4A, which is a side view of a detachable keyboard module provided with a carrier according to an embodiment of the present disclosure. In FIG. 4A, the detachable keyboard module 410a may include key units 411, 412, . . . , 41N and a carrier 420. In this embodiment, the carrier 420 can be used to carry the key units 411-41N and is disposed on the touch panel 499 of the touch device 400. The structure of each of the key units 411 to 41N is similar, and the key unit 411 is described as an example.

As shown in FIG. 4A, the key unit 411 includes a key body 411a, a deformable structure 411b, and a support structure 411c. The key body 411a can be used to receive a pressing operation (for example, a behavior in which a user presses with a finger). The deformable structure 411b is connected to the key body 411a, and can be deformed in response to the above pressing operation. When the above pressing operation disappears, the deformable structure 411b can also be reset. The support structure 411c can be disposed on the carrier 420 for supporting the key body 411a and the deformable structure 411b. However, in other embodiments, each of the key units 411 to 41N can also be implemented in other aspects, and is not limited to the aspect illustrated in FIG. 4A. Moreover, in other embodiments, a conductive material may be disposed in each of the key units 411 to 41N, which may change the capacitance value with the touch panel 499 as the deformable structure 411b is deformed. The details will be explained later.

Figure 4B:
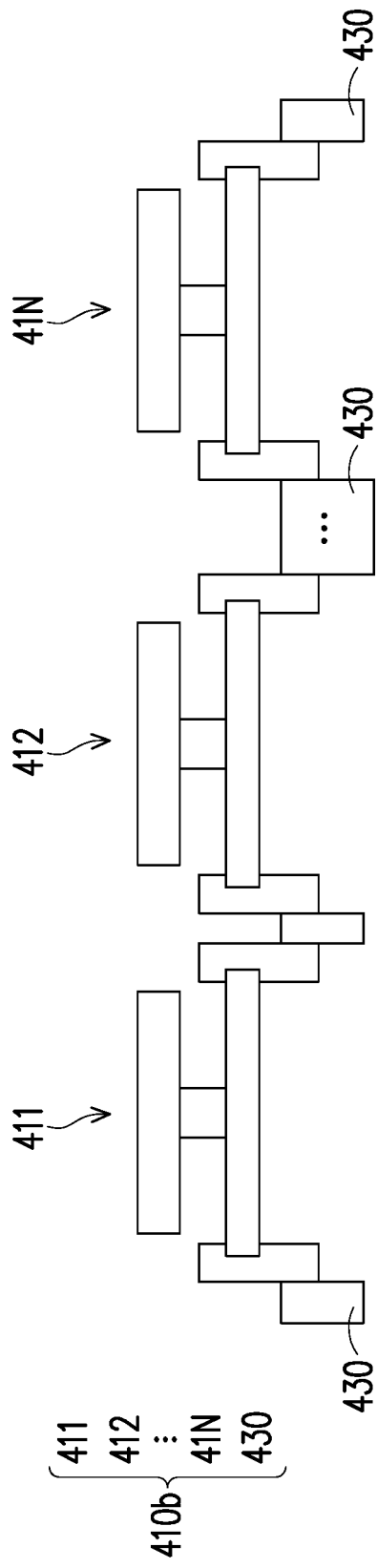
FIG. 4B is a side view of the detachable keyboard module provided with the connecting member according to FIG. 4A.

Please refer to FIG. 4B, which is a side view of the detachable keyboard module provided with the connecting member according to FIG. 4A. Compared with FIG. 4A, the detachable keyboard module 410b of FIG. 4B may include key units 411 to 41N and a connecting member 430. In the present embodiment, the connecting member 430 can be used to connect adjacent key units (e.g., key units 411 and 412). Further, similar to the carrier 420 of FIG. 4A, the connecting member 430 can also be used to be put on a touch panel (not shown) of the touch device.

Figure 4C:
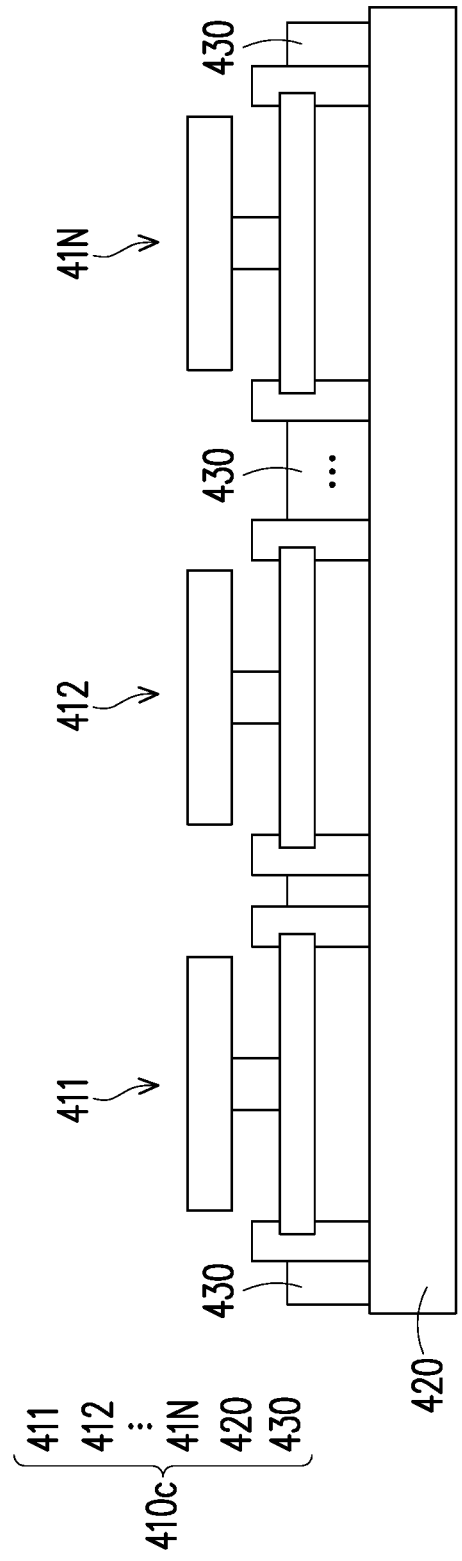
FIG. 4C is a side view of the detachable keyboard module provided with the carrier and the connecting member according to FIGS. 4A and 4B.

Please refer to FIG. 4C, which is a side view of the detachable keyboard module provided with the carrier and the connecting member according to FIG. 4A and FIG. 4B. Compared with FIG. 4A and FIG. 4B, the detachable keyboard module 410 c of FIG. 4C can include key units 411-41N, a carrier 420, and a connecting member 430. In the present embodiment, the connecting member 430 can be used to connect adjacent key units (e.g., key units 411 and 412). The carrier 420 can be used to carry the key units 411 to 41N connected to each other by the connecting member 430, and can be used for being placed on a touch panel (not shown) of the touch device.

Figure 5A:
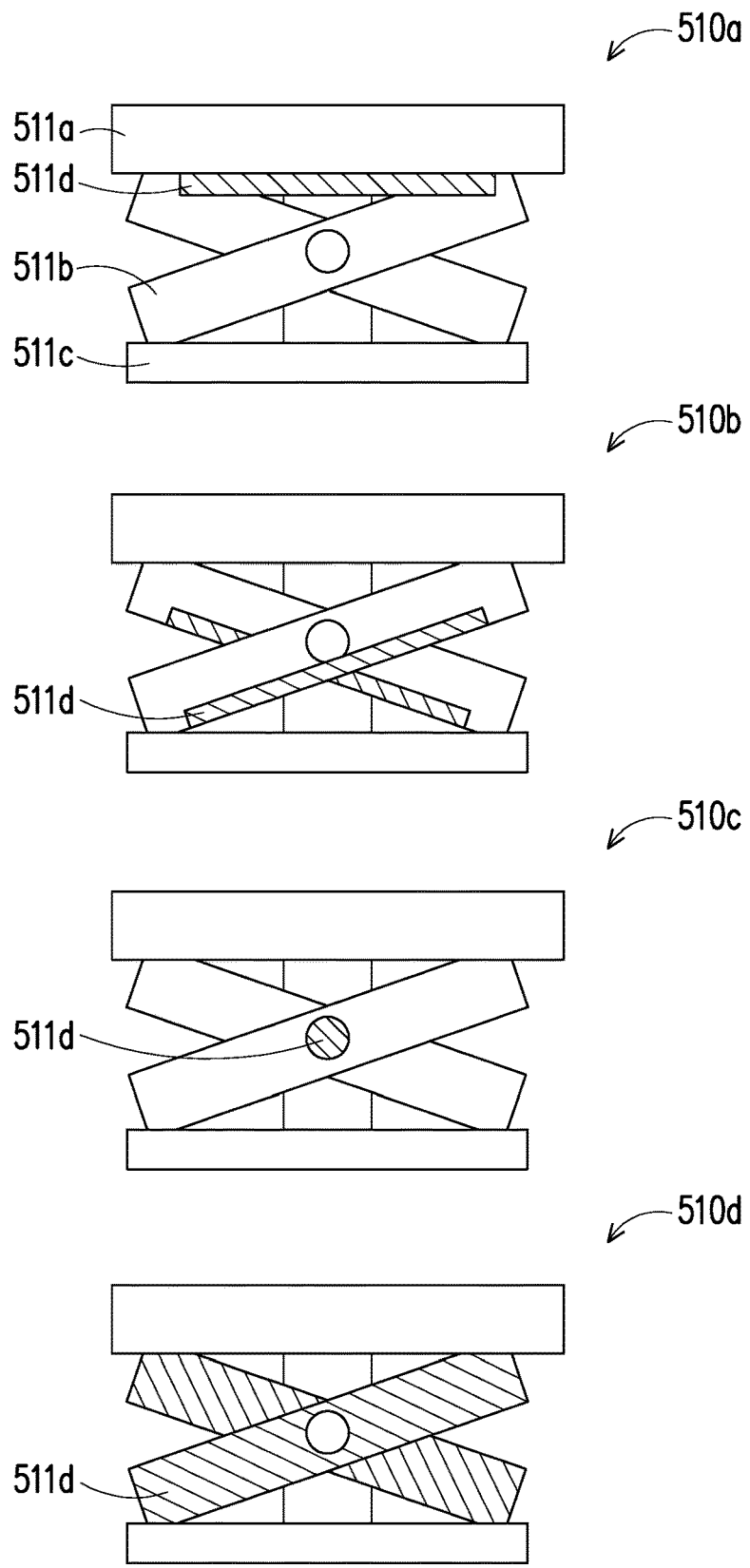
FIG. 5A is a schematic diagram of a plurality of key unit structures according to an embodiment of the present disclosure.

Please refer to FIG. 5A, which is a schematic diagram of a plurality of key unit structures according to an embodiment of the present disclosure. In FIG. 5A, the illustrated key units 510a, 510b, 510c, and 510d have substantially the same structure.

Taking the key unit 510a as an example, the key body 511a includes a key body 511a, a deformable structure 511b, a support structure 511c, and a conductive material 511d. The key body 511a can be used to receive a pressing operation. The deformable structure 511b is connected to the key body 511a and is capable of undergoing a deformation phenomenon in response to the above pressing operation. When the above pressing operation disappears, the deformable structure 511b can also be reset. The support structure 511c can be disposed on a carrier (not shown) for supporting the key body 511a and the deformable structure 511b, and the carrier can be placed on a touch panel (not shown) of the touch device.

In this embodiment, the deformable structure 511b can include a first elastic segment, a second elastic segment, and a third elastic segment. The two ends of the first elastic segment can be respectively pushed against the key body 511a and the supporting structure 511c, and the second elastic segment and the third elastic segment can be pivotally connected to the first elastic segment at an center point to form an X-shaped structure. In this way, when the key body 511a receives the pressing operation, the first elastic segment can be pressed and shortened. Moreover, the second elastic segment and the third elastic segment can be pressed to pivotally rotated relative to the first elastic segment, so that the key body 511a is closer to the support structure 511c, that is, closer to the touch panel of the touch device bearing the key unit 511a.

In the key unit 510a, the conductive material 511d may be disposed at the bottom of the key body 511a. Therefore, during the process in which the key body 511a is pressed to approach the touch panel of the touch device, the capacitance between the conductive material 511d and the touch panel will increase. When the capacitance value is higher than a capacitance threshold, the touch device can detect the touch signal on the corresponding touch panel of the key unit 510a. On the other hand, when the key body 511a is no longer pressed, it will return to the original position as the deformable structure 511b is reset, so that the touch device no longer senses the touch signal.

For the key units 510b-510c, the action patterns presented when they are pressed are similar to those of the key unit 510a, except that the position of the conductive material 511d is different, so the details are not described herein.

Figure 5B:
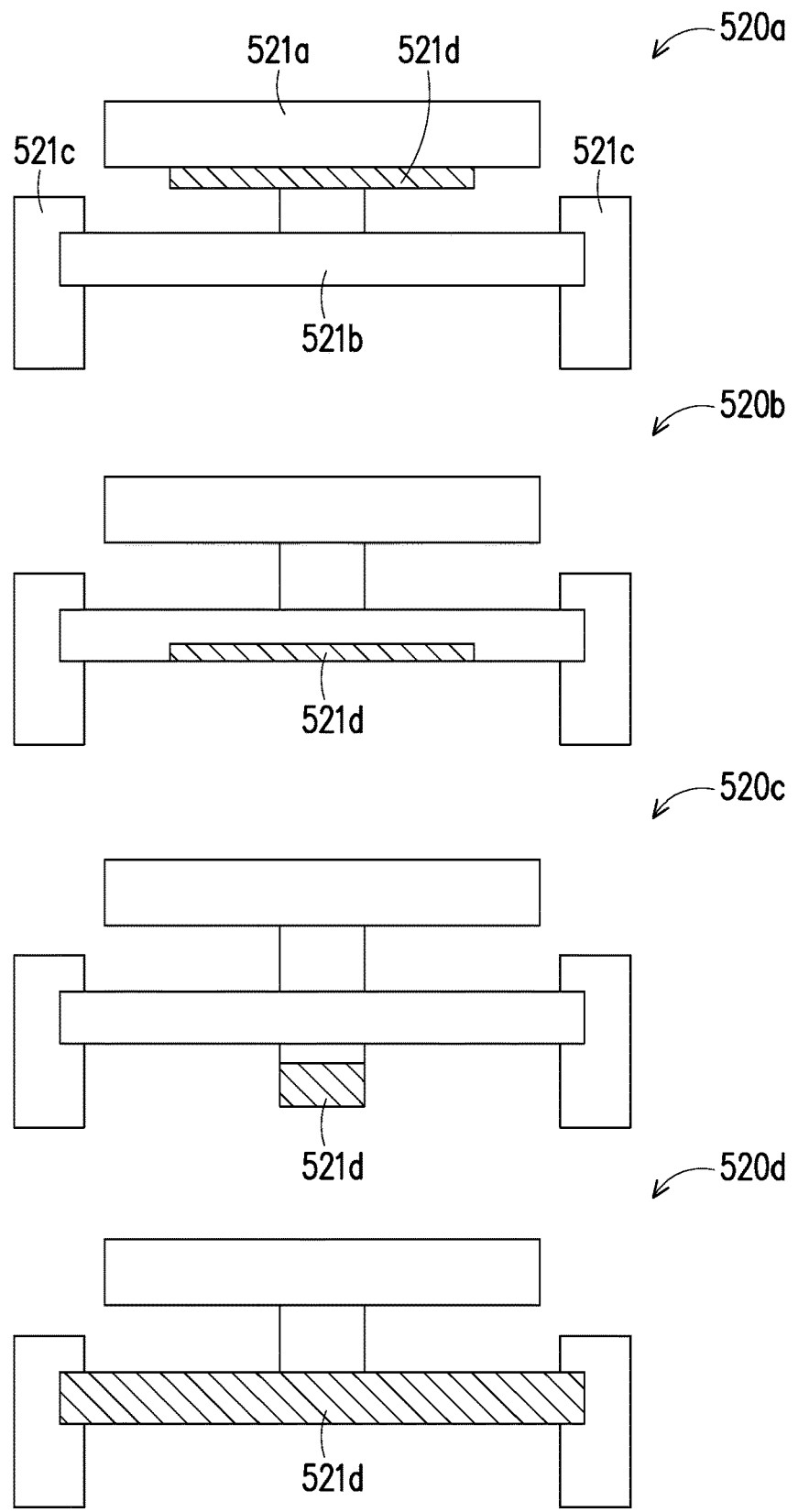
FIG. 5B is a schematic diagram of a plurality of key unit structures according to an embodiment of the present disclosure.

Please refer to FIG. 5B, which is a schematic diagram of a plurality of key unit structures according to an embodiment of the present disclosure. In FIG. 5B, the illustrated key units 520a, 520b, 520c, and 520d have substantially the same structure.

Taking the key unit 520a as an example, it includes a key body 521a, a deformable structure 521b, a support structure 521c, and a conductive material 521d. The key body 521a can be used to receive a pressing operation. The deformable structure 521b is coupled to the key body 521a, and can be deformed in response to the above pressing operation. When the above pressing operation disappears, the deformable structure 521b can also be reset. The support structure 521c can be disposed on a carrier (not shown) for supporting the key body 521a and the deformable structure 521b, and the carrier can be placed on a touch panel (not shown) of the touch device.

In this embodiment, the deformable structure 521b can include a first elastic segment and a second elastic segment. The two ends of the first elastic segment can be respectively connected to the support structure 511c, and the two ends of the second elastic segment can be respectively connected to the first elastic segment and the key body 521a to form an inverted T-shaped structure. In this way, when the key body 521a receives the pressing operation, the second elastic segment can be forced to press the first elastic segment, so that the first elastic segment is pressed and recessed.

Thereby, the key body 521a can be brought closer to the touch panel of the touch device that carries the key unit 521a.

In the key unit 520a, a conductive material 521d may be disposed at the bottom of the key body 521a. Therefore, during the process in which the key body 521a is pressed to approach the touch panel of the touch device, the capacitance between the conductive material 521d and the touch panel will increase. When the capacitance value is higher than a capacitance threshold, the touch device can detect the touch signal on the corresponding touch panel of the key unit 520a. On the other hand, when the key body 521a is no longer pressed, it will return to the original position as the deformable structure 521b is reset, so that the touch device no longer senses the touch signal.

For the key units 520b-520c, the action patterns presented when they are pressed are similar to those of the key unit 520a, except that the position of the conductive material 521d is different, so the details are not described herein.

Figure 5C:
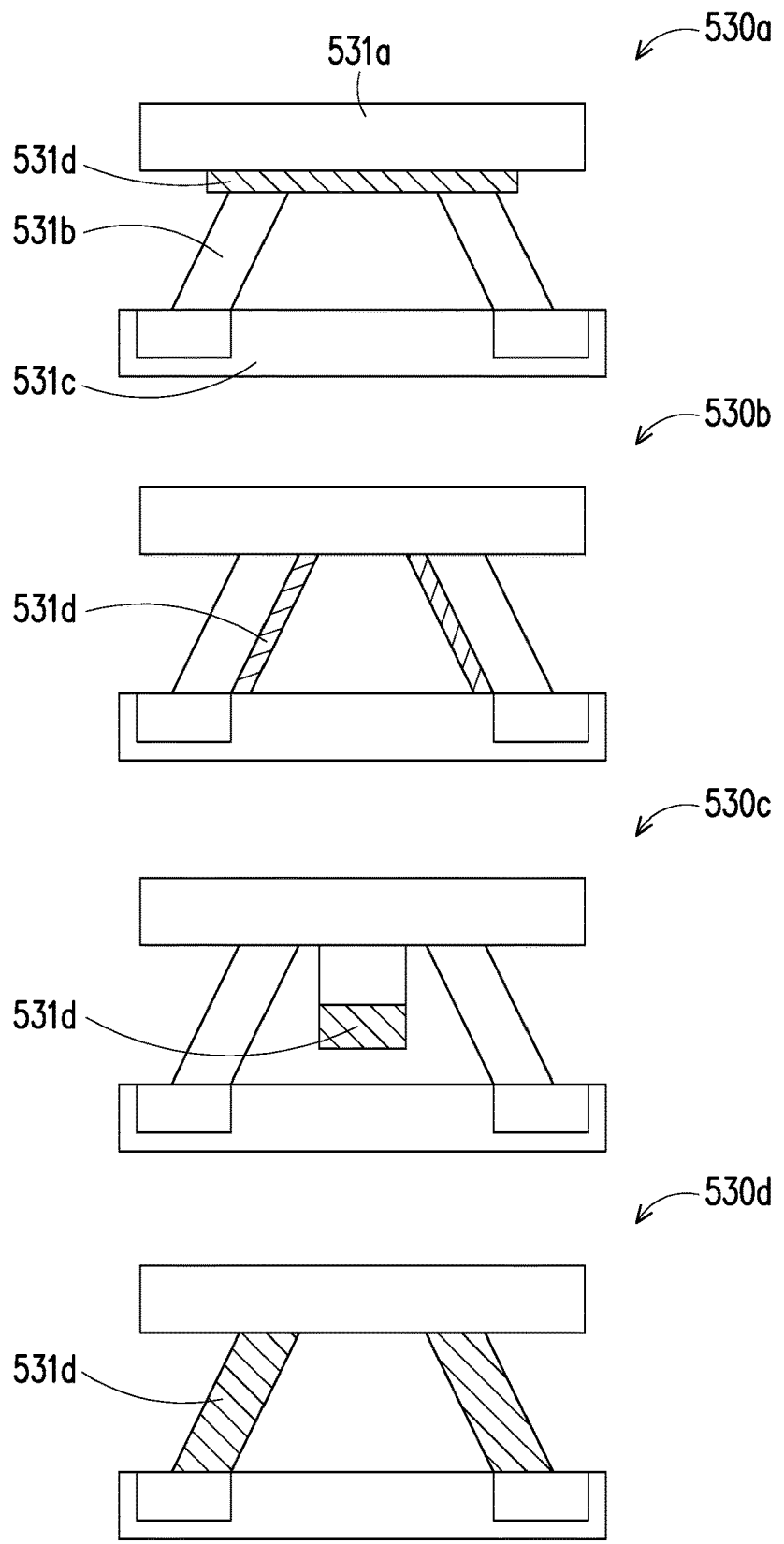
FIG. 5C is a schematic diagram of a plurality of key unit structures according to an embodiment of the present disclosure.

Please refer to FIG. 5C, which is a schematic diagram of a plurality of key unit structures according to an embodiment of the present disclosure. In FIG. 5C, the illustrated key units 530a, 530b, 530c, and 530d have substantially the same structure.

Taking the key unit 530a as an example, the key body 530a includes a key body 531a, a deformable structure 531b, a support structure 531c, and a conductive material 531d. The key body 531a can be used to receive a pressing operation. The deformable structure 531b is coupled to the key body 531a, and can be deformed in response to the above pressing operation. When the above pressing operation disappears, the deformable structure 531b can also be reset. The support structure 531c can be disposed on a carrier (not shown) for supporting the key body 531a and the deformable structure 531b, and the carrier can be placed on a touch panel (not shown) of the touch device.

In this embodiment, the deformable structure 531b can include a first elastic segment and a second elastic segment. Both ends of the first elastic segment and the second elastic segment can respectively push against the key body 531a and the support structure 531c. In this way, when the key body 531a receives the pressing operation, the first elastic segment and the second elastic segment can be pressed and shortened, so that the key body 531a is closer to the supporting structure 531c, that is, closer to the touch panel of the touch device bearing key unit 531a.

In the key unit 530a, a conductive material 531d may be disposed at the bottom of the key body 531a. Therefore, in the process in which the key body 531a is pressed to approach the touch panel of the touch device, the capacitance value between the conductive material 531d and the touch panel will increase accordingly. When the capacitance value is higher than a capacitance threshold, the touch device can detect the touch signal on the corresponding touch panel of the key unit 530a. On the other hand, when the key body 531a is no longer pressed, it will return to the original position as the deformable structure 531b is reset, so that the touch device no longer senses the touch signal.

For the key units 530b-530c, the action patterns presented when pressed are similar to those of the key unit 530a, except that the position of the conductive material 531d is different, so the details are not described herein.

Figure 6A:
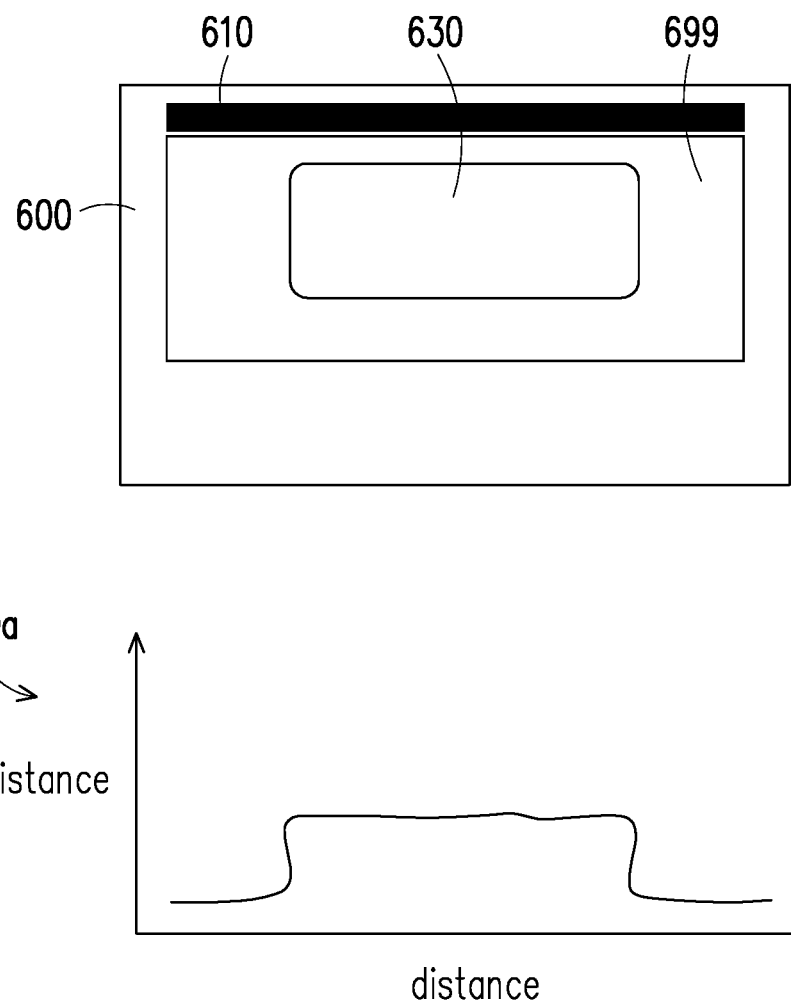
FIG. 6A is a schematic diagram of detecting a detachable keyboard module by a detecting module according to an embodiment of the present disclosure.

Please refer to FIG. 6A, which is a schematic diagram of detecting a detachable keyboard module by using a detecting module according to an embodiment of the present disclosure. As shown in FIG. 6A, the touch device 600 can include a detecting module 610, and the detachable keyboard module 630 can be magnetically attracted to a preset position of the touch panel 699 via a positioning structure (not shown) of the touch device 600. In this embodiment, the detecting module 610 can be implemented as an infrared sensing module, which can be disposed on the top side of the touch panel 699. The detecting module 610 can be used to transmit an infrared signal toward the bottom side of the touch panel 699 and measure the signal strength of the reflected infrared signal.

In FIG. 6A, the detecting module 610 can convert the measured signal strength to a distance and generate graph 640a accordingly. Based on the curve shown in graph 640a, the outline of the detachable keyboard module 630 closer to the side of the detecting module 610 (i.e., the outline of the top side) can be observed.

In this embodiment, after the outline of the detachable keyboard module 630 is measured, the detecting module 610 can determine the identity of the detachable keyboard module 630. Taking the aspect shown in FIG. 3 as an example, if the keyboard aspects 311 to 314 can be used with the touch device 600, based on the measured outline, the detecting module 610 can determine which keyboard aspect is currently being placed on the touch panel 699. That is, the detecting module 610 can know the identity of the detachable keyboard module 630.

Figure 6B:
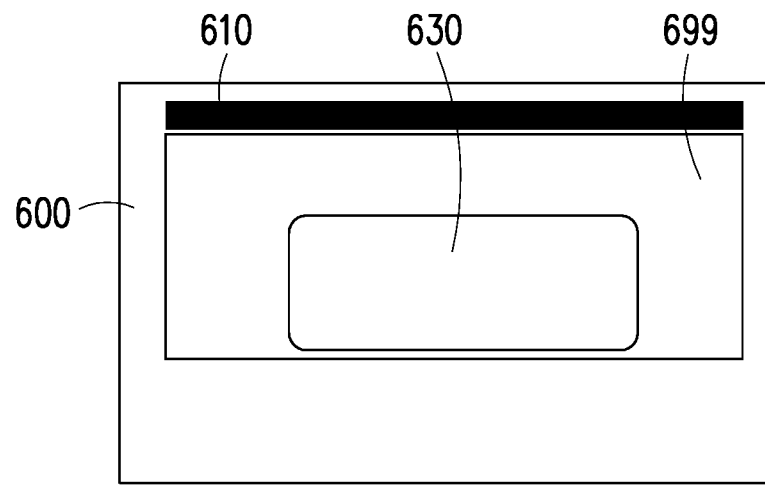
FIG. 6B is a schematic diagram of detecting a detachable keyboard module by using a detecting module according to FIG. 6A.
Figure 6B:
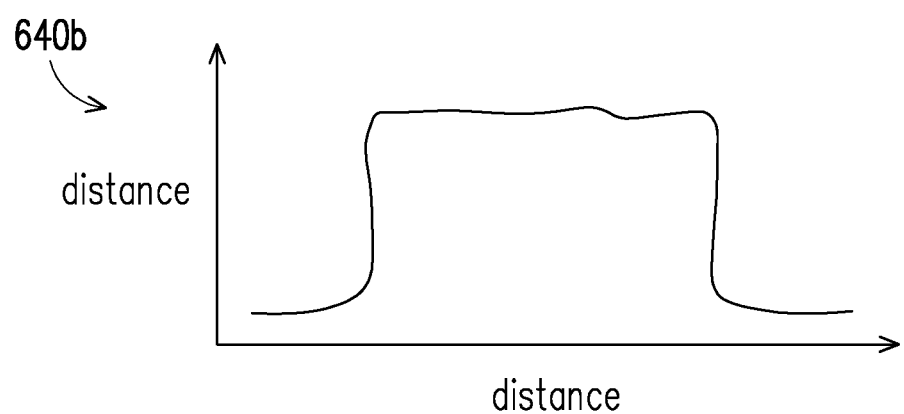

Please refer to FIG. 6B, which is a schematic diagram of detecting a detachable keyboard module by using a detecting module according to FIG. 6A. As shown in FIG. 6B, when the detachable keyboard module 630 is placed in another preset position on the touch panel 699, the detecting module 610 can still generate the graph 640b based on the measured signal strength. Based on the curve shown in graph 640b, the outline of the detachable keyboard module 630 closer to the side of the detecting module 610 (i.e., the outline of the top side) can be known as well.

Figure 6C:
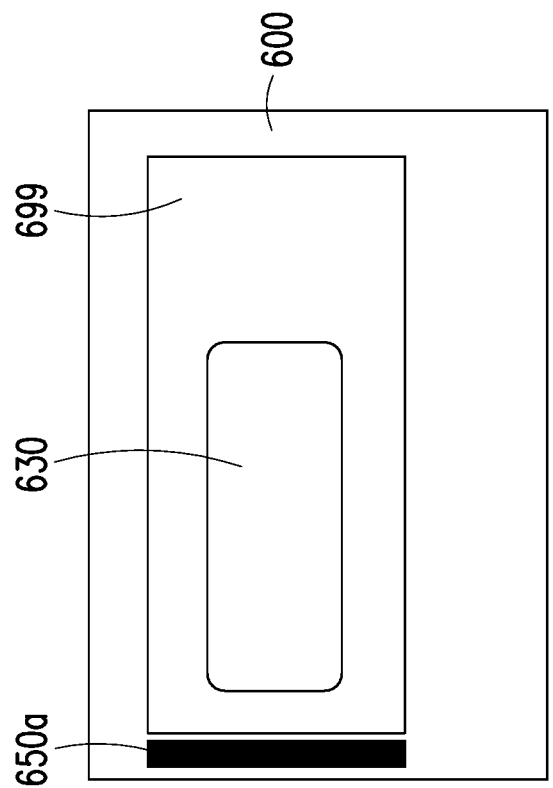
FIG. 6C is a schematic diagram of detecting a detachable keyboard module by a detecting module according to an embodiment of the present disclosure.
Figure 6C:
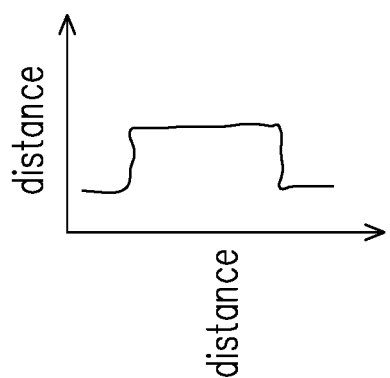

Please refer to FIG. 6C, which is a schematic diagram of detecting a detachable keyboard module by using a detecting module according to an embodiment of the present disclosure. As shown in FIG. 6C, the touch device 600 can include a detecting module 650a, and the detachable keyboard module 630 can be magnetically attracted to a preset position of the touch panel 699 via a positioning structure (not shown) of the touch device 600. In this embodiment, the detecting module 650a can be implemented in the same manner as the detecting module 610 of FIG. 6A. The difference is that the detecting module 650a is disposed on the left side of the touch panel 699.

In FIG. 6C, the detecting module 650a can also know the outline of the side of the detachable keyboard module 630 closer to the detecting module 650a (i.e., the outline on the left side) based on the measured signal strength.

Figure 6D:
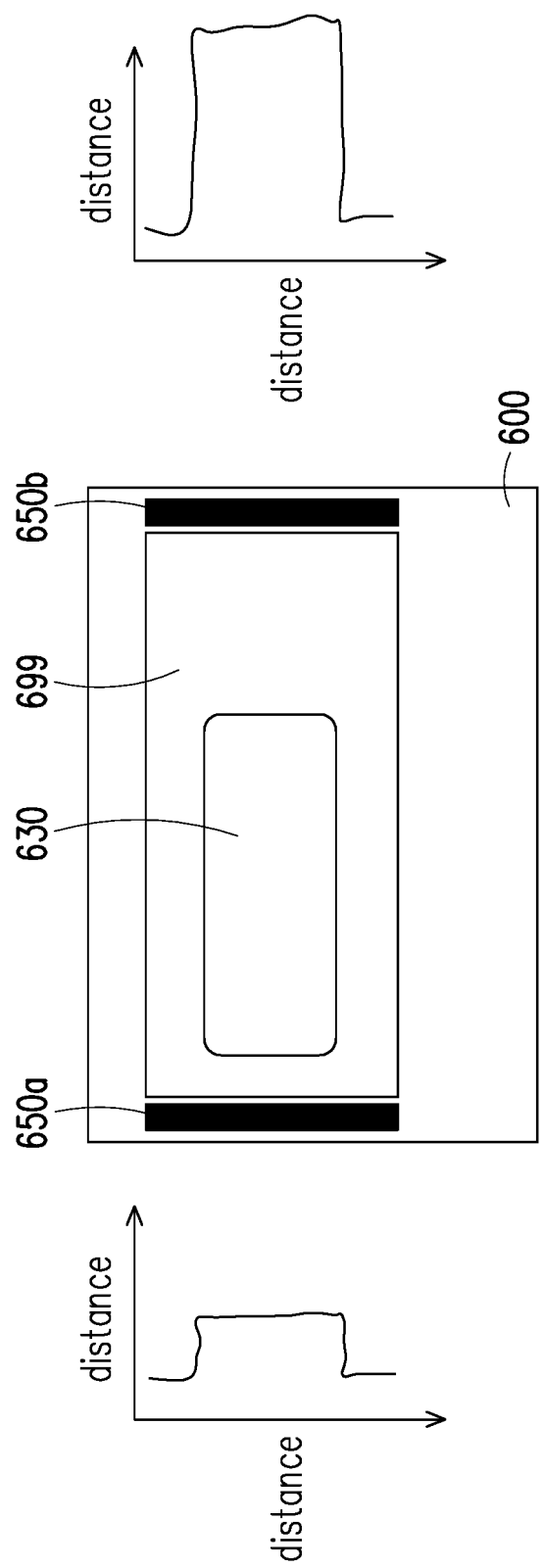
FIG. 6D is a schematic diagram of detecting a detachable keyboard module by using a detecting module according to FIG. 6C.

Please refer to FIG. 6D, which is a schematic diagram of detecting a detachable keyboard module by using a detecting module according to FIG. 6C. As shown in FIG. 6D, the touch device 600 can further include a detecting module 650b, which can be disposed on the right side of the touch panel 699.

In FIG. 6D, the detecting module 650b can also know the outline of the side of the detachable keyboard module 630 closer to the detecting module 650b (i.e., the outline on the right side) based on the measured signal strength. In other words, in the architecture of FIG. 6D, the detecting modules 650a and 650b can respectively measure the outlines of the two sides of the detachable keyboard module 630.

Please refer to FIG. 7A, which is a schematic diagram of detecting a detachable keyboard module by using a detecting module according to an embodiment of the present disclosure. As shown in FIG. 7A, the touch device 700 can include a detecting module 710a, such as an optical detecting component disposed on one side of the touch panel, such as an infrared sensing module. In this embodiment, the detecting module 710a can emit an infrared signal for detecting whether an object is close to the detecting module 710a. When the detachable keyboard module 720a is placed in the preset position close to the detecting module 710a, the detecting module 710a can receive the reflected infrared signal of a certain intensity. Therefore, the detecting module 710a can determine that the detachable keyboard module 720a has been detected. On the other hand, when the detachable keyboard module 720a is removed, the detecting module 710a determines that the detachable keyboard module 720a is not detected because the reflected infrared signal is no longer received.

In short, since the detecting module 710a only needs to detect whether the detachable keyboard module 720a is placed in a preset position, it can be implemented at a lower cost.

Please refer to FIG. 7B, which is a schematic diagram of detecting a detachable keyboard module by using a detecting module according to FIG. 7A. The difference between the detachable keyboard module 720b and the detachable keyboard module 720b is specifically for the detecting module 710a to detect whether the detachable keyboard module 720b is placed on the preset position. Therefore, the carrier bearing the key unit in the detachable keyboard module 720b does not need to be extended to the side of the touch device 700 for the detecting module 720b to detect, thereby increasing design flexibility.

Figure 7C:
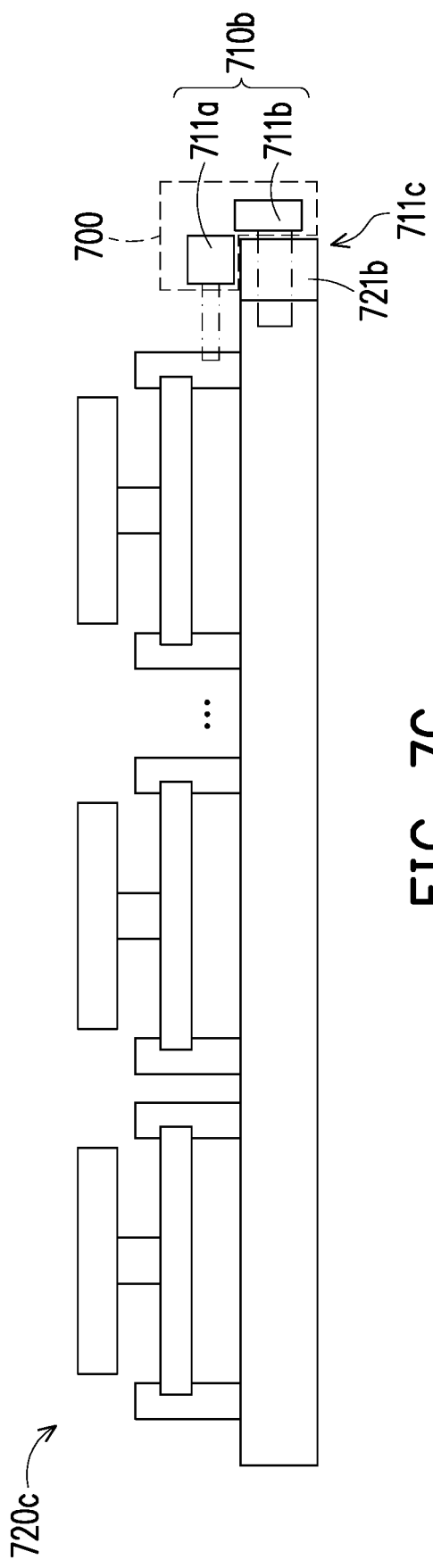
FIG. 7C is a schematic diagram of detecting a detachable keyboard module by using a detecting module according to FIG. 7B.

Please refer to FIG. 7C, which is a schematic diagram of detecting a detachable keyboard module by using a detecting module according to FIG. 7B. In FIG. 7C, the detecting module 710b includes optical detecting components 711a, 711b and a hidden slot 711c. In addition, compared to FIG. 7B, the extending segment 721b of the detachable keyboard module 720c of FIG. 7C is shorter and can be used to insert the hidden slot 711c.

In this embodiment, the optical detecting components 711a, 711b located in the hidden slot 711c can be disposed at different heights and detect in the same direction. As shown in FIG. 7C, the optical detecting component 711a disposed at a higher position can be used to detect whether the key unit of the detachable keyboard module 720c is close, and the optical detecting component 711b disposed at a lower position can be used for detecting whether the extending segment 721b is inserted into the hidden slot 711c. In this embodiment, the detecting module 710b can be designed to determine that the detachable keyboard module 720c has been placed at a preset position when the optical detecting components 711a and 711b simultaneously detect an object. Thereby, the accuracy of detection can be increased.

Figure 7D:
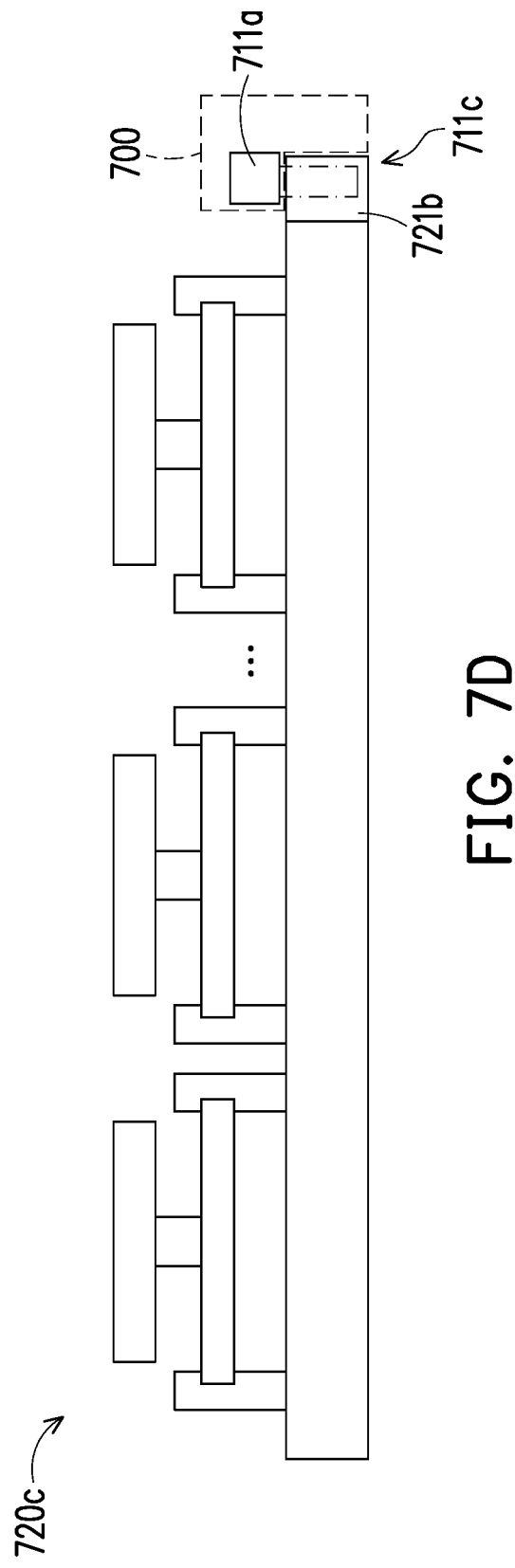
FIG. 7D is a schematic diagram of detecting a detachable keyboard module by using a detecting module according to FIG. 7C.

Please refer to FIG. 7D, which is a schematic diagram of detecting a detachable keyboard module by using a detecting module according to FIG. 7C. The difference from FIG. 7C is that the optical detecting component 711a in FIG. 7D can detect downward. As a result, when the extending segment 721b is inserted into the hidden slot 711c, it can be detected by the optical detecting component 711a. Thereby, the detecting module can determine that the detachable keyboard module 720c has been placed in the preset position.

Figure 8:
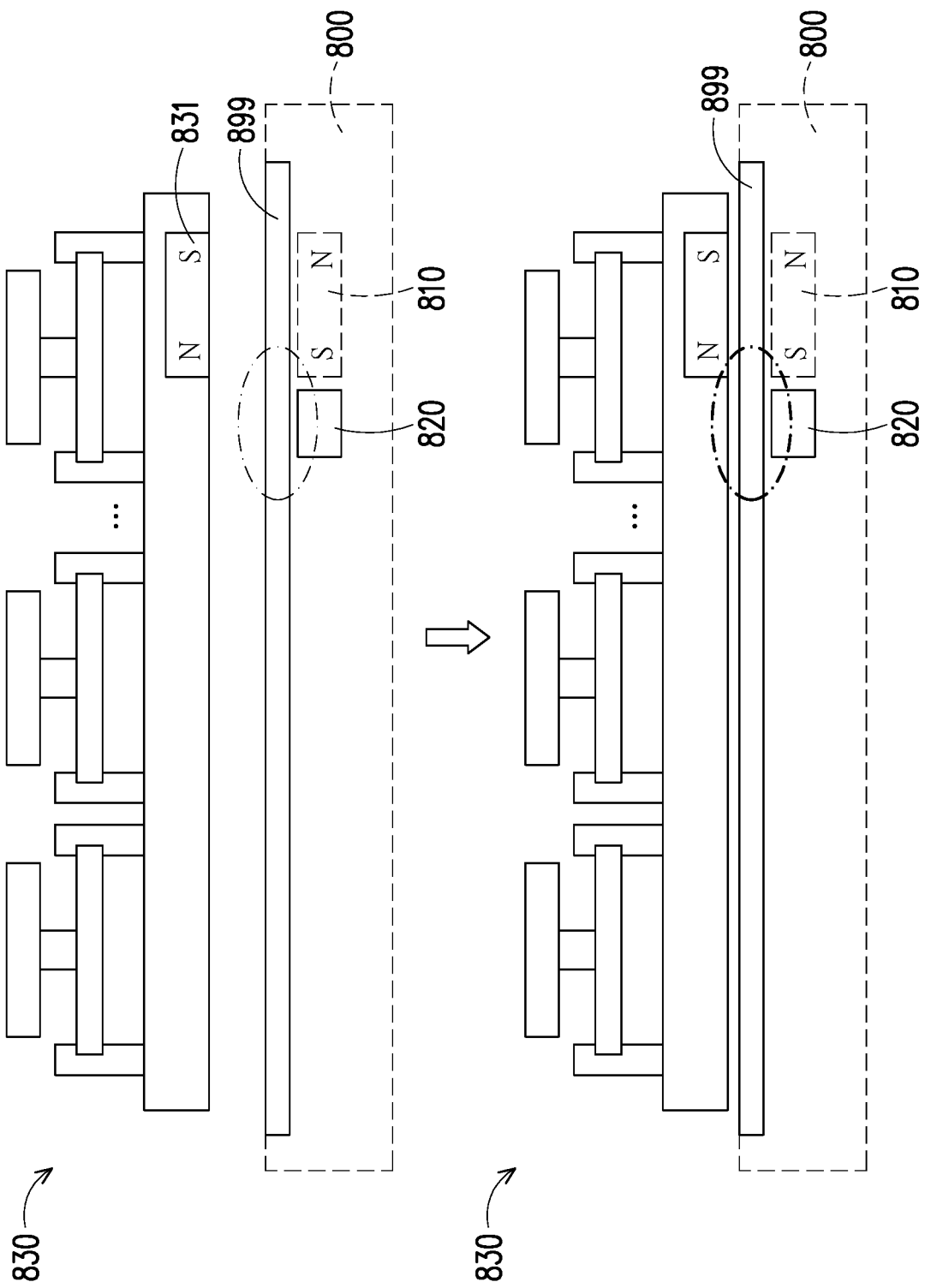
FIG. 8 is a schematic diagram of positioning and detecting a detachable keyboard module based on magnetic force according to an embodiment of the present disclosure.

Please refer to FIG. 8, which is a schematic diagram of positioning and detecting a detachable keyboard module based on magnetic force according to an embodiment of the present disclosure. As shown in FIG. 8, the touch device 800 includes a positioning structure 810 and a detecting module 820. In this embodiment, the positioning structure 810 is, for example, a first magnetic component, which can be disposed under the touch panel 899. The detecting module 820 is, for example, a magnetic sensor (for example, a Hall sensor) disposed adjacent to the positioning structure 810, and can be used to detect whether a nearby magnetic force changes to some extent.

In this embodiment, the detachable keyboard module 830 can include a second magnetic component 831 that can be disposed in a carrier (not labeled) for being attracted to the first magnetic component.

As shown in the lower half of FIG. 8, when the second magnetic component 831 of the detachable keyboard module 830 is attracted to the first magnetic component due to the proximity of the positioning structure 810, the detachable keyboard module 830 can be positioned at the preset position shown in FIG. 8. At the same time, the detecting module 820 can also determine that the detachable keyboard module 830 has been detected due to the detection of a large magnetic force. Thereby, the positioning and detection of the detachable keyboard module 830 can be completed at the same time.

In an embodiment, the first magnetic element and the second magnetic element 831 can both be implemented as magnets. In another embodiment, one of the first magnetic element and the second magnetic element 831 may be implemented as a magnet, and the other may be implemented as a magnetized material (e.g., iron, cobalt, nickel, etc.).

Figure 9A:
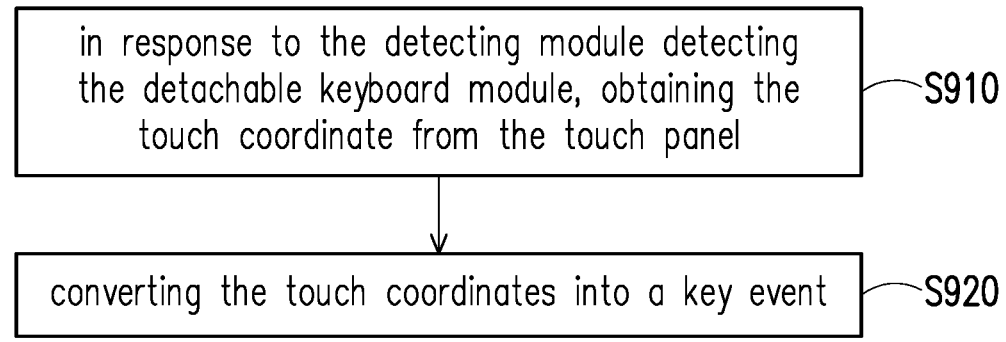
FIG. 9A is a flow chart of generating a key event according to an embodiment of the present disclosure.
Figure 9B:
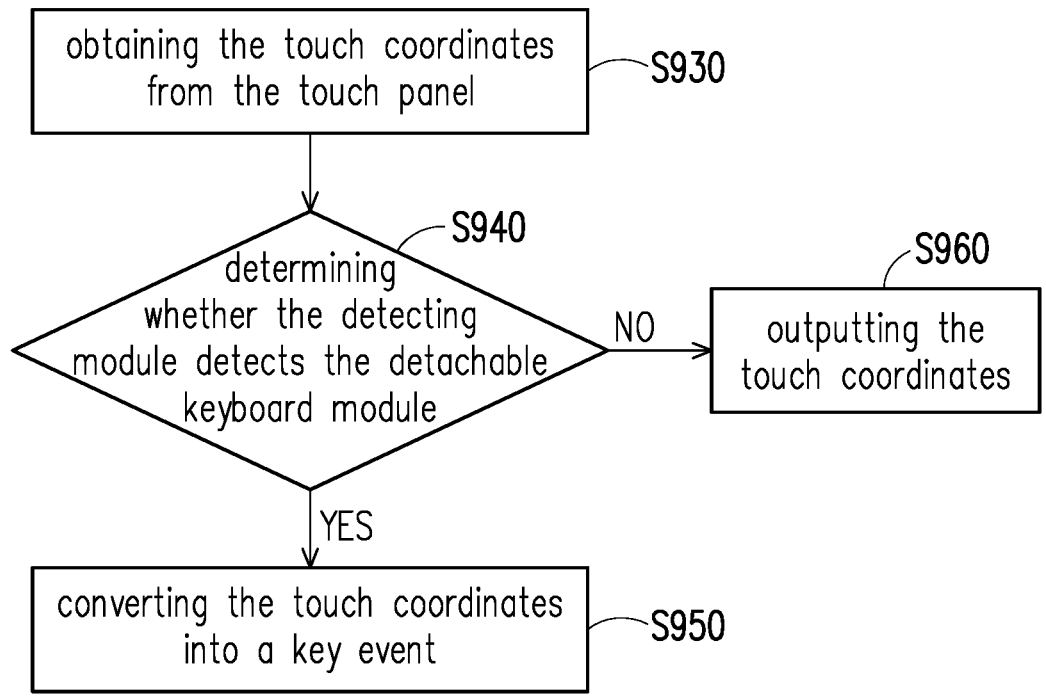
FIG. 9B is a flow chart of generating a key event according to another embodiment of the present disclosure.

After positioning and detecting the detachable keyboard module through the various mechanisms taught in the previous embodiments, the disclosure can convert the keys being pressed on the detachable keyboard module to corresponding key events based on the two mechanisms mentioned in FIG. 9A and FIG. 9B. In general, before the detachable keyboard module is placed on the touch panel, the touch device should perform corresponding operations according to the touch coordinates touched by the user on the touch panel. However, after the detachable keyboard module is placed on the touch panel to partially cover the touch panel, if the touch device obtains the touch coordinates within the coverage of the detachable keyboard module, it represents a key on the detachable keyboard module has been pressed. Therefore, the touch device can convert the touch coordinates into corresponding key events according to the keyboard aspect of the detachable keyboard module.

Please refer to FIG. 9A, which is a flowchart of generating a key event according to an embodiment of the present disclosure. First, in step S910, in response to the detecting module detecting the detachable keyboard module, the touch device can obtain the touch coordinate from the touch panel, wherein the touch coordinate is located in the coverage of the detachable keyboard module on the touch panel. Moreover, in step S920, the touch device can convert the touch coordinates into a key event, which corresponds to the pressed key on the detachable keyboard module. In short, in the mechanism of FIG. 9A, after the touch device detects the detachable keyboard module, the touch device can directly convert one or more touch coordinates in the coverage of the detachable keyboard module on the touch panel to corresponding key events.

On the other hand, if the detachable keyboard module is not detected, the touch device can perform the original operation according to the obtained touch coordinates.

Please refer to FIG. 9B, which is a flowchart of generating a key event according to another embodiment of the present disclosure. First, in step S930, the touch device can obtain the touch coordinates from the touch panel, wherein the touch coordinates are located within the coverage of the detachable keyboard module on the touch panel. In step S940, the touch device can determine whether the detecting module detects the detachable keyboard module. If so, the touch device can continue to perform step S950 to convert the touch coordinates into a key event, which corresponds to the pressed key on the detachable keyboard module. On the other hand, if the detecting module does not detect the detachable keyboard module, the touch device can continue to perform step S960 to output the touch coordinates.

In short, in the mechanism of FIG. 9B, after detecting each touch coordinate, the touch device determines whether a detachable keyboard module is detected. If the detachable keyboard module is detected and the touch coordinates are within the coverage of the detachable keyboard module, the touch device can convert the touch coordinates into corresponding key events. On the other hand, if it is determined that the detachable keyboard module is not detected after the touch coordinates are obtained, the touch device can perform the original operation according to the obtained touch coordinates.

In order to further clarify the present disclosure, the following discussions are further illustrated based on FIG. 10A to FIG. 10F, wherein FIG. 10A to FIG. 10F are application scenario according to various embodiments of the present disclosure. In FIGS. 10A to 10F, it is assumed that the available detachable keyboard modules have the five keyboard aspects shown in Table 1 below (i.e., there are five available detachable keyboard module having different identities).

TABLE 1

| identity | type | function |
|---|---|---|
| ID 1 | General keyboard | A-Z, function keys |
| ID 2 | Numeric keypad | 1~0, + − * / = |
| ID 3 | Gaming keyboard (left) | U/D/L/R |
| ID 4 | Gaming keyboard (right) | A/B |

Figure 10A:
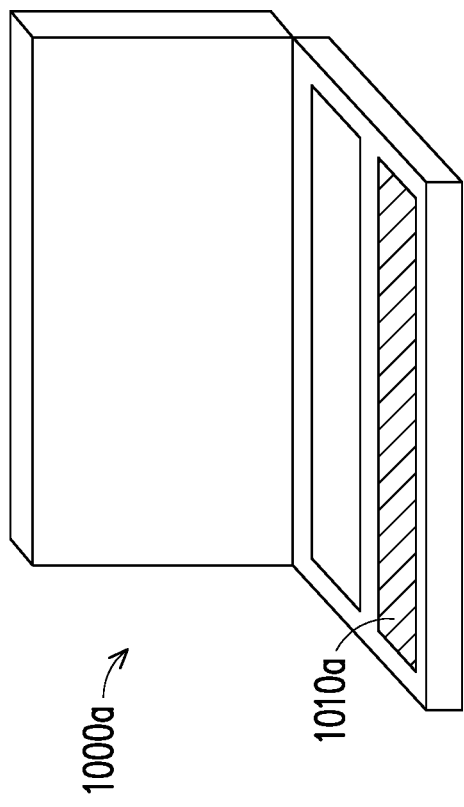
FIGS. 10A-10F are application scenario illustrating various embodiments of the present disclosure.
Figure 10A:
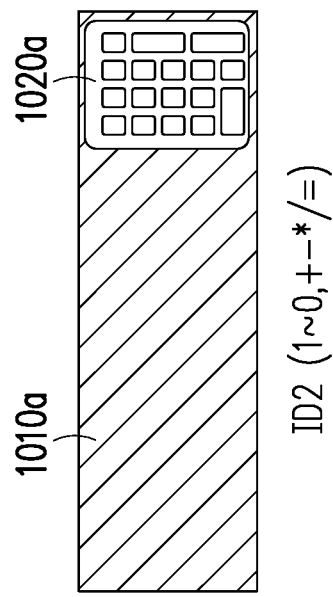

In FIG. 10A, it is assumed that the detachable keyboard module 1020a having the ID2 is placed on the touch panel 1010a of the touch device 1000a. In this case, if the key on the detachable keyboard module 1020a is pressed (for example, the Enter key) to generate a touch coordinate (which should be located approximately at the lower right corner of the touch panel 1010a), the touch device 1000a can know that the touch coordinates should correspond to the Enter key based on the identity of the detachable keyboard module 1020a. Therefore, the touch device 1000a can convert the touch coordinates to a key event corresponding to the Enter key.

Figure 10B:
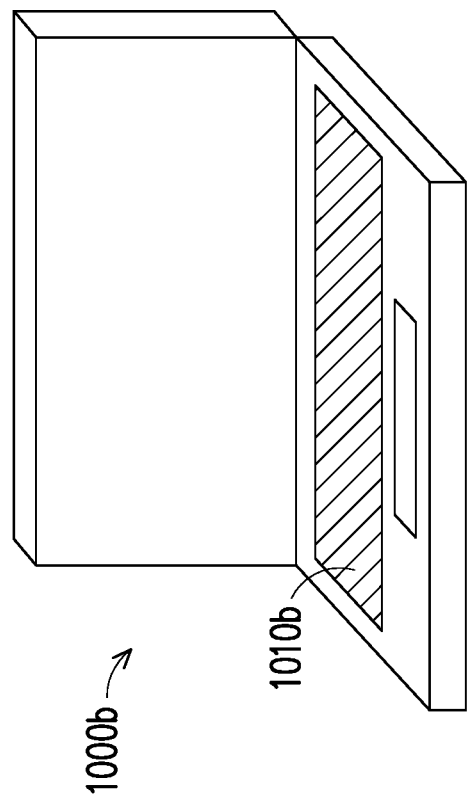
Figure 10B:
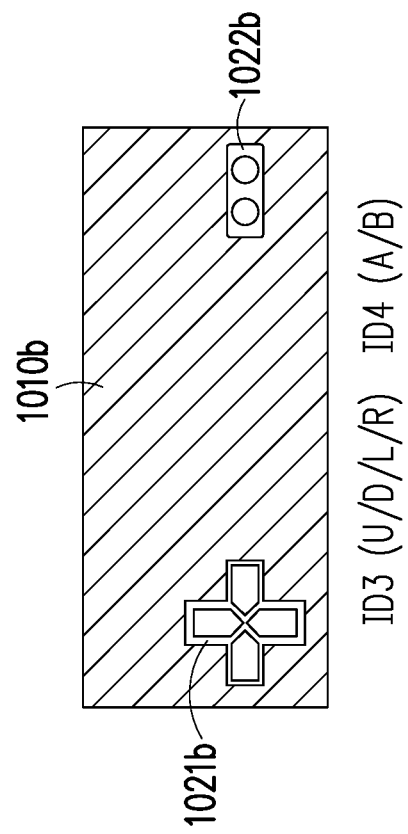

In FIG. 10B, it is assumed that the detachable keyboard module 1021b having the ID3 and the detachable keyboard module 1022b having the ID4 are placed on the touch panel 1010b of the touch device 1000b. In this case, if the key on the detachable keyboard module 1021b is pressed (for example, the left direction key (L)) to generate a touch coordinate, the touch device 1000b can know that the touch coordinates should correspond to the left direction key based on the identity of the detachable keyboard module 1021b. Therefore, the touch device 1000b can convert the touch coordinates to a key event corresponding to the left direction key.

In addition, if the key on the detachable keyboard module 1022b is pressed (for example, the A key) to generate the touch coordinate, the touch device 1000b can know that the touch coordinate should correspond to the A key according to the identity of the detachable keyboard module 1022b. Therefore, the touch device 1000b can convert the touch coordinates to a key event corresponding to the A key.

Figure 10C:
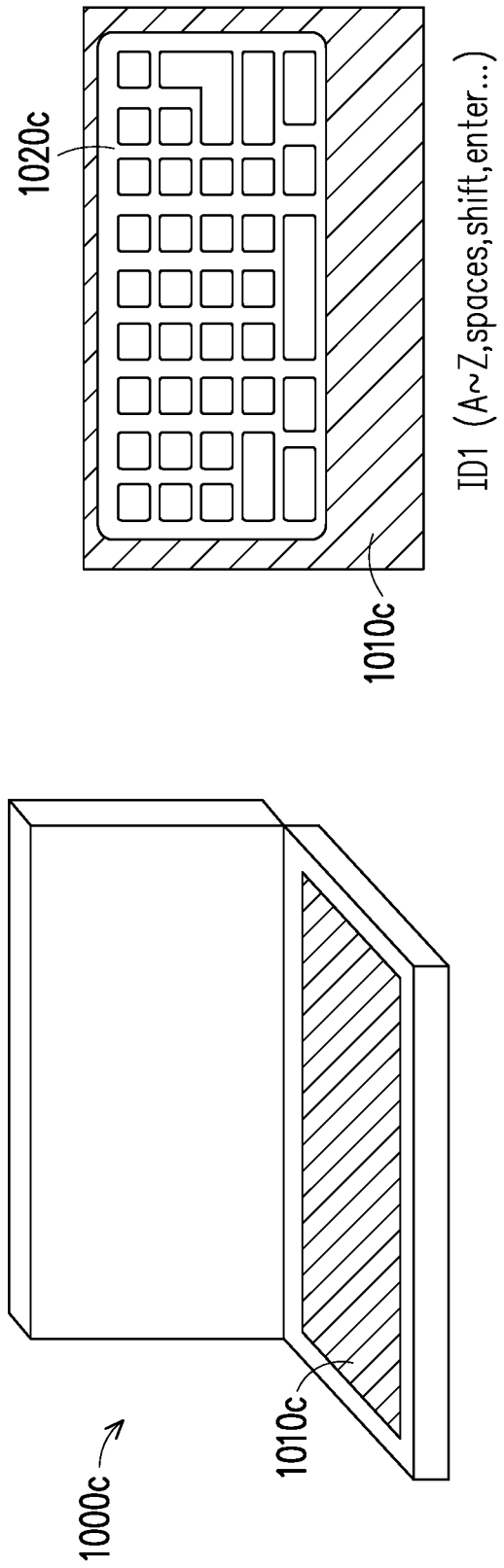

In FIG. 10C, it is assumed that the detachable keyboard module 1020c having the ID1 is placed on the touch panel 1010c of the touch device 1000c. In this case, if the key on the detachable keyboard module 1020c is pressed (for example, the Esc key) to generate the touch coordinate, the touch device 1000c can know that the touch coordinate should correspond to the Esc key according to the identity of the detachable keyboard module 1020c. Accordingly, the touch device 1000c can convert the touch coordinates to a key event corresponding to the Esc key.

Figure 10D:
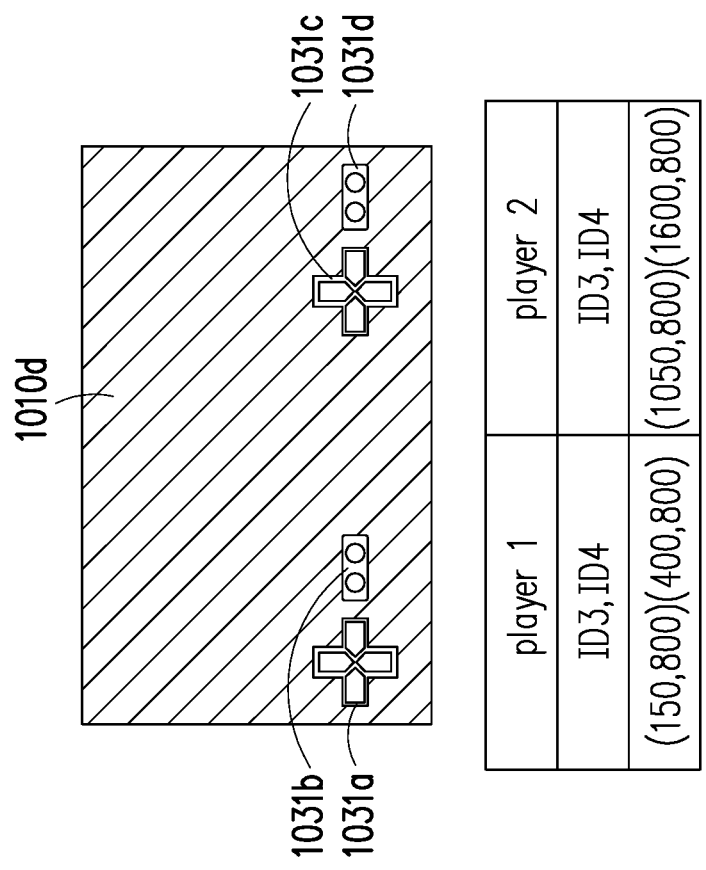
Figure 10D:
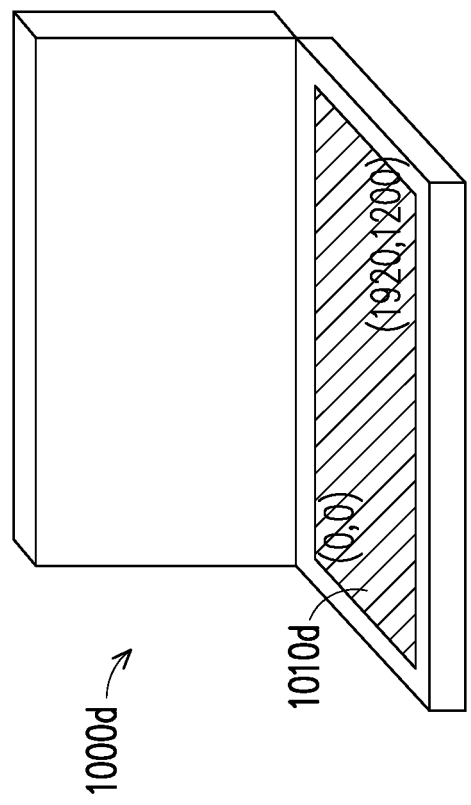

In FIG. 10D, it is assumed that the detachable keyboard modules 1031a and 1031c having the ID3 and the detachable keyboard modules 1031b and 1031d having the ID4 are placed on the touch panel 1010d of the touch device 1000d. The touch coordinates obtained on the control panel 1010d can be designed to be located between (0, 0) and (1920, 1200). In this embodiment, the detachable keyboard modules 1031a and 1031b can be configured to correspond to the player 1, and the detachable keyboard modules 1031c and 1031d can be configured to correspond to the player 2, and their respective touch coordinate range is shown in FIG. 10D.

In this case, if the key on the detachable keyboard module 1031a is pressed (for example, the left direction key) to generate a touch coordinate, the touch device 1000d can know that the touch coordinate should correspond to the left direction key entered by player 1 based on the identity of the detachable keyboard module 1031a. Based on this, the touch device 1000d can convert the touch coordinates into a key event corresponding to the left direction key input by the player 1. In another example, if the key on the detachable keyboard module 1031d is pressed (for example, the A key) to generate a touch coordinate, the touch device 1000d can know that the touch coordinate should correspond to the A key entered by player 2 based on the identity of the detachable keyboard module 1031d. Based on this, the touch device 1000d can convert the touch coordinates to a key event corresponding to the A key input by the player 2.

Figure 10E:
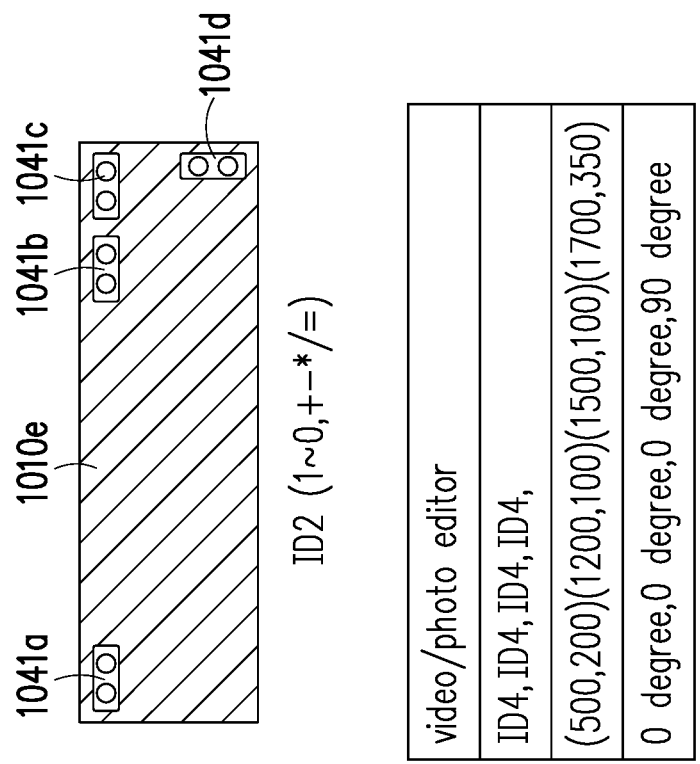
Figure 10E:
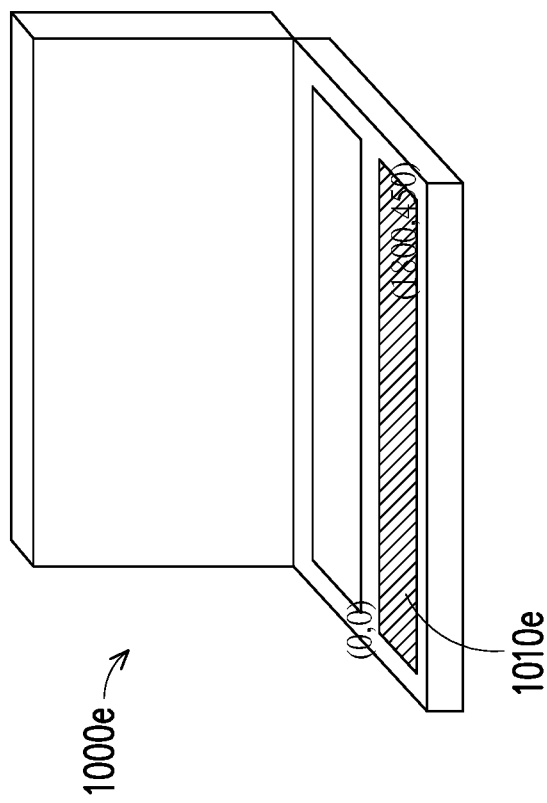

In FIG. 10E, it is assumed that the detachable keyboard module 1041a having the ID4 and the detachable keyboard modules 1041b, 1041c, and 1041d having the ID4 are placed on the touch panel 1010e of the touch device 1000e. The touch coordinates obtained on the control panel 1010e can be designed to be located between (0, 0) and (1800, 450). In this embodiment, the corresponding touch coordinate range of the detachable keyboard modules 1041a to 1041d is as shown in FIG. 10E, wherein the detachable keyboard module 1041d is configured to rotate 90 degrees, so the corresponding touch coordinate range can also be changed accordingly.

Figure 10F:
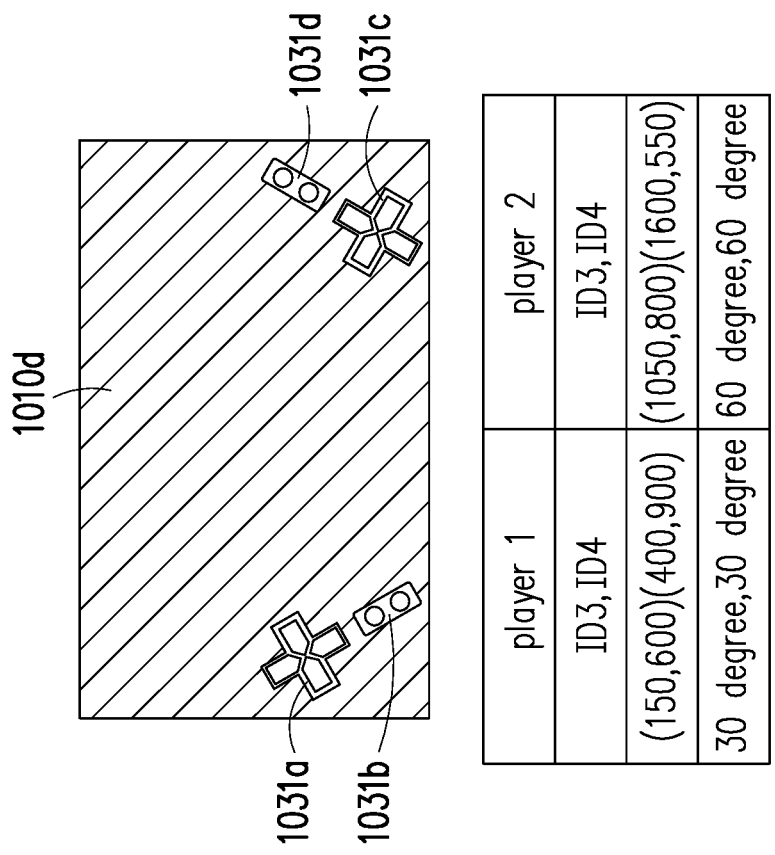
Figure 10F:
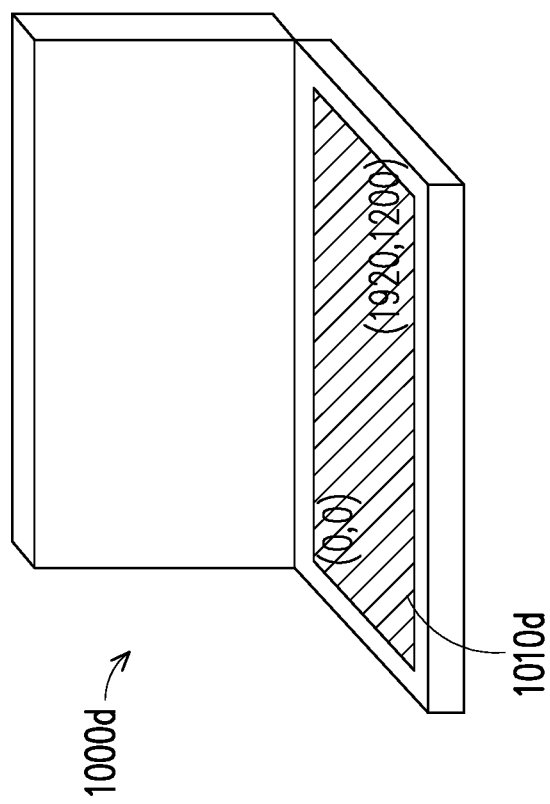

Please refer to FIG. 10F, which can be regarded as a variant embodiment of FIG. 10D. In FIG. 10F, the detachable keyboard modules 1031a and 1031b corresponding to the player 1 and the detachable keyboard modules 1031c and 1031d corresponding to the player 2 can be tilted in the manner shown. In this case, the touch coordinate range corresponding to the detachable keyboard modules 1031a to 1031d can also be changed accordingly.

In summary, the touch device provided by the disclosure can be used with a plurality of detachable keyboard modules through the positioning structure and the detecting module. In this case, the user can place a detachable keyboard module having a corresponding keyboard aspect on the touch panel according to requirements, so as to operate the touch device in a manner consistent with general keyboard input habits. Moreover, when the detachable keyboard module is not required, the user can easily remove the detachable keyboard module from the touch panel to perform the desired touch operation by using the touch panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch device, comprising:
 a touch panel, bearing a detachable keyboard module;
 a positioning structure, fixing the detachable keyboard module to the touch panel, wherein the detachable keyboard module fixed to the touch panel partially covers the touch panel; and
 a detecting module, detecting the detachable keyboard module fixed on the touch panel and comprises at least one optical detecting component disposed on at least one side of the touch panel and transmitting an optical signal toward a bottom side of the touch panel to measure a signal strength of a reflected optical signal for detecting a position of the detachable keyboard module and accordingly determining a type of the detachable keyboard module.

2. The touch device of claim 1, wherein the positioning structure comprises a positioning slot disposed on one side of the touch panel and corresponding to a protruding portion on the detachable keyboard module, wherein the positioning slot accommodates the protruding portion to fix the detachable keyboard module to a preset position on the touch panel.

3. The touch device of claim 1, wherein the positioning structure comprises a first magnetic component disposed in the touch panel and corresponding to a second magnetic component on the detachable keyboard module, wherein the first magnetic component attracts the second magnetic component to fix the detachable keyboard module to a predetermined position on the touch panel.

4. The touch device of claim 3, wherein the detecting module comprises a magnetic sensor disposed in the touch panel adjacent to the first magnetic component, wherein the magnetic sensor is determines that the detachable keyboard module is detected in response to a magnetic force change caused by the first magnetic component attracting the second magnetic component.

5. The touch device of claim 3, wherein one of the first magnetic element and the second magnetic element is a magnet, and another of the first magnetic element and the second magnetic element is a magnetized material.

6. The touch device of claim 1, wherein the detecting module comprises at least one optical detecting component disposed on one side of the touch panel, wherein when a signal strength measured by the at least one optical detecting component is higher than a strength threshold, determining that the detachable keyboard module has been detected.

7. The touch device of claim 6, wherein the detecting module further comprises a hidden slot disposed on the side of the touch panel, and the at least one optical detecting component is disposed in the hidden slot.

8. The touch device of claim 1, wherein the touch device is configured to:
 in response to the detecting module detecting the detachable keyboard module, obtaining a touch coordinate from the touch panel, wherein the touch coordinate is located in a coverage of the detachable keyboard module on the touch panel; and
 converting the touch coordinate to a key event, wherein the key event corresponds to a pressed key on the detachable keyboard module.

9. The touch device of claim 1, wherein the touch device is configured to:
 obtaining a touch coordinate from the touch panel, wherein the touch coordinate is located in a coverage of the detachable keyboard module on the touch panel;
 determining whether the detecting module detects the detachable keyboard module; and
 in response to the detecting module detecting the detachable keyboard module, converting the touch coordinate into a key event, wherein the key event corresponds to a pressed key on the detachable keyboard module.

10. The touch device of claim 1, wherein the detachable keyboard module is a passive keyboard module.

11. The touch device of claim 1, wherein the detachable keyboard module comprises a plurality of key units, wherein each of the key units comprises:
 a key body for receiving a pressing operation;
 a deformable structure connected to the key body, generating a defoi illation phenomenon in response to the pressing operation, and resetting after the pressing operation disappears;
 a conductive material disposed on the key body or the deformable structure, moving along with the deformation phenomenon, and correspondingly changing a capacitance value between the touch panel and the touch panel; and
 a support structure supporting the key body and the deformable structure.

12. The touch device of claim 11, wherein the detachable keyboard module further comprises at least one of a connecting member and a carrier, the connecting member being connected between the key units, the carrier is configured to carry the key units and is placed on the touch panel.

13. The touch device of claim 12, wherein the detachable keyboard module further comprises an extending segment connected to the carrier, the extending segment being configured for the detecting module to detect whether the detachable keyboard module is placed on the touch panel.

14. The touch device of claim 13, wherein the positioning structure comprises a positioning slot, and the extending segment is further accommodated in the positioning slot to fix the detachable keyboard module to a preset position on the touch panel.

15. An operating method of a touch device comprising a touch panel, a positioning structure and a detecting module, wherein the method comprises:
 bearing, by the touch panel, a detachable keyboard module;
 fixing, by the positioning structure, the detachable keyboard module to the touch panel, wherein the detachable keyboard module fixed to the touch panel partially covers the touch panel; and
 detecting, by the detecting module, the detachable keyboard module fixed on the touch panel, wherein the detecting module comprises at least one optical detecting component disposed on at least one side of the touch panel and transmitting an optical signal toward a bottom side of the touch panel to measure a signal strength of a reflected optical signal for detecting a position of the detachable keyboard module and accordingly determining a type of the detachable keyboard module.

16. The method of claim 15, further comprising:
in response to the detecting module detecting the detachable keyboard module, obtaining a touch coordinate from the touch panel, wherein the touch coordinate is located in a coverage of the detachable keyboard module on the touch panel; and
converting the touch coordinate to a key event, wherein the key event corresponds to a pressed key on the detachable keyboard module.

17. The method of claim 15, further comprising:
obtaining a touch coordinate from the touch panel, wherein the touch coordinate is located in a coverage of the detachable keyboard module on the touch panel;
determining whether the detecting module detects the detachable keyboard module; and
in response to the detecting module detecting the detachable keyboard module, converting the touch coordinate into a key event, wherein the key event corresponds to a pressed key on the detachable keyboard module.

18. The method of claim 15, wherein the detecting module comprises at least one optical detecting component disposed on one side of the touch panel, and the step of detecting, by the detecting module, the detachable keyboard module fixed on the touch panel comprises:
when a signal strength measured by the at least one optical detecting component is higher than a strength threshold, determining that the detachable keyboard module has been detected.

* * * * *